US006513152B1

(12) United States Patent
Branson et al.

(10) Patent No.: US 6,513,152 B1
(45) Date of Patent: Jan. 28, 2003

(54) OBJECT ORIENTED FRAMEWORK MECHANISM FOR CUSTOMIZATION OF OBJECT ORIENTED FRAMEWORKS

(75) Inventors: Michael J. Branson, Rochester, MN (US); Charles S. Gauthier, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 754 days.

(21) Appl. No.: 08/899,255

(22) Filed: Jul. 23, 1997

(51) Int. Cl.[7] .................................................. G06F 9/44

(52) U.S. Cl. ........................ 717/100; 717/101; 717/102; 717/108; 717/116; 707/103 R

(58) Field of Search .......................... 395/183.22, 680, 395/670, 701; 707/4, 536, 103; 706/27

(56) References Cited

U.S. PATENT DOCUMENTS

| | | | |
|---|---|---|---|
| 4,943,932 A | 7/1990 | Lark et al. ................. 706/60 |
| 5,057,996 A | 10/1991 | Cutler et al. ............... 395/676 |
| 5,101,364 A | 3/1992 | Davenport et al. ......... 345/328 |
| 5,119,475 A | 6/1992 | Smith et al. ................ 345/353 |
| 5,181,162 A | 1/1993 | Smith et al. ................ 707/530 |
| 5,195,172 A | 3/1993 | Elad et al. .................. 706/62 |
| 5,226,161 A | 7/1993 | Khoyi et al. ............... 395/683 |
| 5,247,693 A | 9/1993 | Bristol ....................... 395/705 |
| 5,249,270 A | 9/1993 | Stewart et al. ............ 395/200.52 |
| 5,257,384 A | 10/1993 | Farrand et al. ............. 395/285 |
| 5,261,080 A | 11/1993 | Khoyi et al. ............... 395/500 |
| 5,274,572 A | 12/1993 | O'Neill et al. ............. 702/57 |
| 5,276,775 A | 1/1994 | Meng ........................ 706/51 |
| 5,287,447 A | 2/1994 | Miller et al. ............... 345/342 |
| 5,293,470 A | 3/1994 | Birch et al. ................ 345/435 |
| 5,297,283 A | 3/1994 | Kelly, Jr. et al. .......... 395/674 |
| 5,315,703 A | 5/1994 | Matheny et al. ........... 345/507 |
| 5,367,633 A | 11/1994 | Matheny et al. ........... 345/514 |
| 5,369,766 A | 11/1994 | Nakano et al. ............. 395/685 |
| 5,379,430 A | 1/1995 | Nguyen ..................... 707/3 |
| 5,388,264 A | 2/1995 | Tobias, II et al. .......... 707/103 |
| 5,390,325 A | 2/1995 | Miller ....................... 395/183.11 |

(List continued on next page.)

OTHER PUBLICATIONS

Text of IBM Technical Disclosure Bulletin, vol. 37, DeBinder et al., Feb. 1994, "Results Folder Framework", pp. 431–432

(List continued on next page.)

*Primary Examiner*—Gregory Morse
*Assistant Examiner*—Chameli Das
(74) *Attorney, Agent, or Firm*—Martin & Associates, LLC; Derek P. Martin

(57) ABSTRACT

An object oriented framework mechanism for customization of object oriented frameworks provides an infrastructure that embodies the steps necessary to customize a selected object oriented framework (referred to herein as an "input framework"). Combining core functions provided by the framework with extensions provided by the framework consumer (i.e., user), results in a framework customization environment. The architecture of the framework allows a user to determine the conditions and parameters that apply to the specific framework customization environment while allowing the user to interact with the framework using an interface that is consistent regardless of the specific combination of parameters specified by the user. The extensible functions allow new framework customization environments to be easily implemented using the framework. The framework thus allows a common programming interface for generating many different framework customization environments and also provides a substantially common user interface for customizing any input framework. An input framework is selected, and a subset of the extension points for the selected framework are selected for customizing the input framework. Each extension point generates one or more extensions, which are added to the customized framework. The customized framework may then be saved, and may be used to generate a customized application.

93 Claims, 28 Drawing Sheets

U.S. PATENT DOCUMENTS

| | | | | |
|---|---|---|---|---|
| 5,396,626 A | | 3/1995 | Nguyen ..................... | 395/701 |
| 5,398,336 A | | 3/1995 | Tantry et al. ............... | 707/103 |
| 5,555,368 A | * | 9/1996 | Orton et al. ................ | 395/670 |
| 5,594,642 A | * | 1/1997 | Collins et al. .............. | 707/536 |
| 5,668,998 A | * | 9/1997 | Mason et al. ............... | 395/680 |
| 5,745,675 A | * | 4/1998 | Herbig et al. .......... | 395/183.22 |
| 5,778,378 A | * | 7/1998 | Rubin ........................... | 707/4 |
| 5,787,425 A | * | 7/1998 | Bigus .......................... | 706/27 |

OTHER PUBLICATIONS

Text of IBM Technical Disclosure Bulletin, vol. 36, Coskun, N., Jun. 1993, "Persistent Framework Independent Record/Playback Framework", pp. 261–264.

Text of IBM Technical Disclosure Bulletin, Baker et al., Oct. 1991, "Model View Schema", pp. 321–322.

Text of IBM Technical Disclosure Bulletin, Baker et al., Oct. 1991, "Office Container Class", pp. 309–310.

Text of IBM Technical Disclosure Bulletin, Cavendish et al., Jul. 1991, "Icon Pane Class", pp. 118–119.

Text of IBM Technical Disclosure Bulletin, Baker et al., Jun. 1991, "Distribution List Class", p. 159.

Text of IBM Technical Disclosure Bulletin, Cavendish et al., Jun. 1991, "Object–Oriented Documentation Tool", pp. 50–51.

Text of IBM Technical Disclosure Bulletin, Allard et al., Feb. 1990, "Object–Oriented Programming in C—the Linnaeus System", pp. 437–439.

Text of IBM Technical Disclosure Bulletin, vol. 38, No. 1, Jan. 1995, pp. 411–414, J. Knapman, "Generating Specific Server Programs in Distributed Object–Oriented Customer Information Control System".

Text of IBM Technical Disclosure Bulletin, vol. 37, No. 12, Dec. 1994, pp. 19–20, Al–Karmi et al., "Events Set for Event Tracing in Distributed Object–Oriented Systems".

Text of IBM Technical Disclosure Bulletin, vol. 37, No. 12, Dec. 1994, pp. 375–378, Acker et al., "Automatically Generating Formatted Documentation of Object–Oriented Class Libraries".

Text of IBM Technical Disclosure Bulletin, vol. 37, No. 11, Nov. 1994, pp. 71–72, Behrs et al., "Device Support Framework to Support ISO DPA 10175 and POSIX 1387.4".

Text of IBM Technical Disclosure Bulletin, vol. 37, No. 7, Jul. 1994, pp. 145–146, Banda et al., "Exception Management Algorithm for Multi–Threaded Method Invocation".

Text of IBM Technical Disclosure Bulletin, vol. 37, No. 6B, Jun. 1994, pp. 553–556, Gest et al., "Portable Object–Oriented Event Manager".

Abstract for WIPO Patent Application No. WO 95/04966, F. T. Nguyen, Feb. 16, 1995, "Automatic Management of Components in Object–Oriented System".

Abstract for U.S. Patent No. 5,388,264, Milne et al., Feb. 7, 1995, "Object–Oriented Framework System for Enabling Multimedia Presentations with Routing and Editing of MIDI Information".

Abstract for WIPO Patent Application No. WO 94/23364, Heninger et al., Oct. 13, 1994, "Framework Processing Apparatus for Application Software".

Abstract for U.S. Patent No. 5,369,766, Heninger et al., Nov. 29, 1994, "Object Oriented Application Processing Apparatus".

Abstract from WIPO Patent Application No. WO 9422081, Sep. 29, 1994, "Hardware–Independent Interface for Interupt Processing", G. O. Norman et al.

Abstract for WIPO Patent Application No. 94/19752, Anderson et al., Sep. 1, 1994, "Concurrent Framework Processing Apparatus for Two or More Users".

Abstract for WIPO Patent Application No. 94/19751, Anderson et al., Sep. 1, 1994, "Concurrent Framework Processing Apparatus for Application Users".

Abstract for WIPO Patent Application No. 94/19740, Goldsmith et al., Sep. 1, 1994, "Framework Processor of Object–Oriented Application".

Abstract for WIPO Patent Application No. WO 94/15286, Goldsmith et al., Jul. 7, 1994, "Object–Oriented Framework for Object Operating System".

Abstract for WIPO Patent Application No. 94/15282, Anderson et al., Jul. 7, 1994, "Dialog System Object–Oriented System Software Platform".

Abstract for WIPO Patent Application No. 94/15281, Anderson et al., Jul. 7, 1994, "Atomic Command Object–Oriented System Software Platform".

Abstract from WIPO Patent Application No. WO 9415285, Jul. 7, 1994, "Object–Oriented Notification Framework System", D. R. Anderson et al.

Abstract for U.S. Patent No. 5,119,475, Schoen et al., Jun. 2, 1992, "Object–Oriented Framework for Menu Definition".

Abstract No. 95–091003/12, "Flexible Multi–Platform Partitioning for Computer Applications in Object Oriented System".

Abstract for WIPO Patent Application No. 95/01610, Koko et al., Jan. 12, 1995, "Object Oriented Product Structure Management in Computer–Aided Product Design".

Abstract for WIPO Patent Application No. 95/04967, Feb. 16, 1995, "Access Method to Data Held in Primary Memory Based Data Base".

Abstract for WIPO Patent Application No. 95/02219, Helgeson et al., Jan. 19, 1995, "Distributed Computation Based on Movement, Execution and Insertion of Processes in Network".

Abstract from U.S. Patent No. 5,371,891, "Object Constructions in Compiler in Object Oriented Programming Language", J. Gray et al., Dec. 6, 1994.

Abstract from EPO Patent Application No. EP 622730, "Encapsulation of Extracted Portions of Documents Into Objects", M. A. Malamud, Nov. 2, 1994.

Abstract for EPO Patent No. 619544, S. Danforth, Oct. 12, 1994, "Language–Neutral Object–Oriented Programming".

Abstract for WIPO Patent No. 94/20912, Beckstrom et al., Sep. 15, 1994, "Object–Oriented System for Managing Financial Instruments".

Inspec Abstract No. C9504–7460–043, Sells et al., 1995, "Implementation of the Architecture for a Time–Domain Dynamical System Simulation in a Very High–Level Pictorial Object–Oriented Programming Environment".

Inspec Abstract No. C9503–6140D–045, Satoh et al., 1995, "Process Algebra Semantics for a Real Time Object Oriented Programming Language".

Inspec Abstract No. C9501–7160–020, C. Le Pape, 1993, "The Cost of Genericity: Experiments With ConstraintBased Representations of Time–Tables".

Inspec Abstract No. C9501–7330–007, Salminen et al., 1994, "Modelling Trees Using an Object–Oriented Scheme".

Inspec Abstract No. C9412–6110B–221, Berghel et al., 1992, "A Generic Object–Oriented Concurrency Mechanism for Extensibility and Reuse of Synchronization Components".

Inspec Abstract No. B9412–6210Q–016, from Qingzhong et al., 1992, "An Object–Oriented Model for Ingelligent Networks".

Inspec Abstract No. C9412–7810–003, from Jun et al., 1993, "Development of an Object–Oriented Anthropometric Database for an Ergonomic Man Model".

Inspec Abstract No. C9412–6110J–014 from Griss et al., 1994, "Object–Oriented Reuse".

Inspec Abstract No. C9411–6130B–108, from Mili et al., 1992, "Building a Graphical Interface for a Reuse–Oriented Case Tool".

Inspec Abstract No. C9411–7100–029, from C. Le Pape, 1994, "Implementation of Resource Constraints in ILOG Schedule: A Library for the Development of Constraint–Based Scheduling Systems".

Inspec Abstract No. C9411–6115–035, from Mili et al., 1991, "SoftClass: An Object–Oriented Tool for Software–Reuse".

Inspec Abstract No. C9410–6180G–015, from Eichelberg et al., 1993, "Integrating Interactive 3D–Graphics into an Object–Oriented Application Framework".

Inspec Abstract No. B9409–6210M–025, from Hellemans et al., 1994, "An Object–Oriented Approach to Dynamic Service Descriptions".

Inspec Abstract No. C9409–6180–059, from Wang et al., 1993, "A Framework for User Customization".

Inspec Abstract No. C9408–6110B–016, from Chen et al., 1994, "An Experimental Study of Using Reusable Software Design Frameworks to Achieve Software Reuse".

Inspec Abstract No. C9408–7420–021, from Pirklbauer et al., 1994, "Object–Oriented Process Control Software".

Inspec Abstract No. C9408–6110J–011, from Gyu–Chung et al., 1993, "System Methodologies of Object–Oriented Programs".

Inspec Abstract No. C9407–7420D–045, from Desai et al., "Controller Structure Definition Via Intelligent Process Control".

Inspec Abstract No. C9407–6140D–014, from Satoh et al., 1994, Semantics for a Real–Time Object–Oriented Programming Language.

Inspec Abstract No. C9406–6150N–015, from Schmidt et al., 1994, "The Service Configurator Framework: An Extensible Architecture for Dynamically Configuring Concurrent, Multi–Service Network Daemons".

Inspec Abstract No. C9405–6180G–031, from Woyak et al., 1993, "A Motif–Like Object–Oriented Interface Framework Using PHIGS".

Inspec Abstract No. C9403–6180–027, 1991, "An Event–Object Recovery Model for Object–Oriented User Interfaces" from Proceedings of ACMSymposium on User Interface Software & Technology.

Inspec Abstract No. C9504–6130B–049, from A. van Dam, 1995, "VR as a Forcing Function: Software Implications of a New Paradigm".

Inspec Abstract No. C9504–6140D–024, from Sheffler et al., 1995, "An Object–Oriented Approach to Nested Data Parallelism".

Inspec Abstract No. C9503–6110B–45, from Rosiene et al., 1995, "A Data Modeling Framework for Queueing Network Models".

Inspec Abstract No. B9503–8110B–023, from Mautref et al., 1995, "An Object–Oriented Framework for the Development of Interactive Decision Support Systems".

Inspec Abstract No. C9502–7160–026, from Menga et al., 1995, "An Object–Oriented Framework for Enterprise Modelling".

Inspec Abstract No. C9502–6130G–006, "Support for Enterprise Modelling in CSCW", P. Hennessy et al., 1994.

Inspec Abstract No. C9501–6115–039, from Elia et al., 1993, "G++: An Object Oriented Environment for Developing Distributed Applications".

Inspec Abstract No. C9412–7330–186, from Righter et al., 1994, "An Object–Oriented Characterization of Spatial Ecosystem Information".

Inspec Abstract No. C9412–6160J–025 from J. Iivari, 1994, "Object–Oriented Information Systems Analysis: A Comparison of Six Object–Oriented Analysis Methods".

Inspec Abstract No. C9412–6110J–006, from Lau et al., 1993, "Using SOM for Tool Integration".

Inspec Abstract No. C9411–6160J–011, from Odberg et al., 1992, "A Framework for Managing Schema Versioning in Object–Oriented Databases".

Inspec Abstract No. C9406–7490–012, "A Discrete–Event Object–Oriented Modeling Environment for Sawmill Simulation".

Inspec Abstract No. C9406–6115–048, 1993, "Constructing Multi–View Editing Environments Using MViews".

Inspec Abstract No. 4464213, "Maintaining Information about Persistent Replicated Objects in a Distributed System", 1993 IEEE Conference on Distributed Computing Systems.

Inspec Abstract No. C9406–6110J–029, "A Comparison of Object–Oriented Analysis and Design Methods", Proceedings of C++World 1993.

Inspect Abstract No. C9406–0310F–011, 1993, "Cost–Benefit Analysis of Object–Oriented Technology".

Inspec Abstract No. C9406–6110J–007, from J. D. Grimes, 1994, "Objects 101–An Implementation View", Proceedings of COMPCON 1994.

Inspec Abstract No. 4647921, from Uhorchak et al., 1993, "An Object–Oriented Class Library for Creating Engineering Graphs Using PHIGS".

Inspec Abstract No. 4642214, from Marshall et al., 1992, "Using VDM Within an Object–Oriented Framework".

Inspec Abstract No. 4626386, from Arora et al., 1993, "Building Diverse Environments with PCTE Workbench".

Inspec Abstract No. 4622794, from Campbell et al., 1993, "A Technique for Documenting the Framework of an Object–Oriented System".

Inspec Abstract No. 4618974, from Bowers 1993, "Some Principles for the Encapsulation of the Bahaviour of Aggregate Objects".

Inspec Abstract No. 4616931, from Islam et al., 1993, "Uniform Co–Scheduling Using Object–Oriented Design Techniques".

Inspec Abstract No. 4613481, from Thieme et al., 1993, "Schema Integration in Object–Oriented Databases".

Inspec Abstract No. 4603430, from G. Booch, 1994, "Designing an Application Framework".

Inspec Abstract No. 4596323, from Frank et al., 1993, "An Integrated Environment for Designing Object–Oriented Enterprise Models".

Inspec Abstract No. 4593721, Periyasamy et al., 1993, "A Formal Framework for Design and Verification of Robotic Agents".

Inspec Abstract No. 4588839, from L. Fisher, 1992, "Constructing a Class Library for Microsoft Windows".

Inspec Abstract No. 4588834, from G. Olander, 1992, "Chembench: Redesign of a Large Commercial Application Using Object–Oriented Techniques".

Inspec Abstract No. 4566447, from J. Rossazza, 1992, "An Object–Centered Fuzzy Representation".

Inspec Abstract No. 4565630, from Karpovich et al, 1993, "A Parallel Object–Oriented Framework for Stencil Algorithms".

Inspec Abstract No. 4558162, from Bruegge et al., 1993, "A Framework for Dynamic Program Analyzers".

Inspec Abstract No. 4550414, from Parrish et al., 1993, "Automated Flow Graph–Based Testing of Object–Oriented Software Modules".

Inspec Abstract No. 4540729, from Bailes et al., "The Ecology of Class Refinement".

Inspec Abstract No. 4534334, from Campbell et al., 1992, "A Technique for Documenting the Framework of an Object–Oriented System".

Inspec Abstract No. 4534330, from Istavrinos et al., 1992, "Experiences with an Object–Oriented Mapper for Coherent Distributed Shared Memory".

Inspec Abstract No. 4528985, from Beneventano et al., 1993, "Taxonomic Reasoning with Cycles in LOGIDATA+".

Inspec Abstract No. 452573, from Hakimzadeh et al., 1993, "Instance Variable Access Locking for Object–Oriented Databases".

Inspec Abstract No. 4512593, from H. Sakai, 1993, "A Method for Contract Design and Delegation in Object Behavior Modeling".

Inspec Abstract No. 4473614, from S. Rudkin, 1993, "Templates, Types and Classes in Open Distributed Processing".

Inspec Abstract No. 4459325, from Kesim et al., 1992, "On the Evolution of Objects in a Logic Programming Framework".

Inspec Abstract No. 4447153, from Klein et al., 1992, "An Object–Oriented Framework for Curves and Surfaces".

Inspec Abstract No. 4426852, from Benveniste et al., 1992, "Concurrent Programming Notations in the Object–Oriented Language Arche".

Inspec Abstract No. 4425343, from Demurjian et al., 1993, "Programming Versus Databases in Object–Oriented Paradigm".

Inspec Abstract No. 4417604, from Kraiem et al., 1992, "Mapping of Conceptual Specifications Into Object–Oriented Programs".

Inspec Abstract No. 4417563, from E. Maim, 1993, "Recognizing Objects from Constraints".

Inspec Abstract No. 4411998, from Yi Deng et al., 1992, "Unifying Multi–Paradigms in Software System Design".

Inspec Abstract No. 4408394, from Allen et al., 1992, "GEM: Global Event Management in CAD Frameworks".

Inspec Abstract No. 4400350, from Y. Shoham, 1993, "Agent–Oriented Programming".

Inspec Abstract No. 4395549, from Hogstrom et al., 1992, "Portability and Data Structures in Scientific Computing–Object–Oriented Design of Utility Routines in Fortran".

Inspec Abstract No. 4391388, from Thomas et al., 1992, "A Generic Object–Oriented Concurrency Mechanism for Extensibility and Reuse of Synchronization Components".

Inspec Abstract No. 4387201, from Chu et al., 1992, "A Pattern Based Approach of Integrating Data and Knowledge to Support Cooperative Query Answering".

Inspec Abstract No. 4366189, from Holt et al., 1992, "A Framework for Using Formal Methods in Object–Oriented Software Development".

Inspec Abstract No. 4356300, from Bertino et al., 1993, "Path–Index: An Approach to the Efficient Execution of Object–Oriented Queries".

Inspec Abstract No. 4341376, from Bertino et al., 1992, "Optimization of Object–Oriented Queries Using Path Indices".

Inspec Abstract No. 4331060, from Lau et al., 1992, "An Object–Oriented Class Library for Scalable Parallel Heuristic Search".

Inspec Abstract No. 4318465, from P. Madany, 1992, "Object–Oriented Framework for File Systems".

Inspec Abstract No. 4302722, from Eggenschwiler et al., 1992, "ET++SwapsManager: Using Object Technology in the Financial Engineering Domain".

Inspec Abstract No. 4298324, from S. Nichol, 1992, "Extending Turbo Vision".

Inspec Abstract No. 4297404, from Tanaka et al., 1992, "Two–Level Schemata and Generalized Links for Hypertext Database Models".

Inspec Abstract No. 4287814, from Natarajan et al., 1992, "Issues in Building Dynamic Real–Time Systems".

Inspec Abstract No. 4281362, from Marshall et al., 1991, "Using VDN within an Object–Oriented Framework".

Inspec Abstract No. 4275707, from Tsukamoto et al., 1991, "DOT: A Term Representation Using DOT Algebra for Knowledge–Bases".

Inspec Abstract No. 4275698, from Van den Bussche et al., 1991, "Evaluation and Optimization of Complex Object Selections".

Inspec Abstract No. 4275693, from Giannotti et al., 1991, "Non–Determinism in Deductive Databases".

Inspec Abstract No. 4270361, from Artale et al., 1991, "Introducing Knowledge Representation Techniques in Database Models".

Inspec Abstract No. 4270125, from Becker et al., 1991, "Reusable Object–Oriented Specifications for Decision Support Systems".

Inspec Abstract No. 4258492, from M. Ball, 1992, "Inside Templates: Implementing C++ Strategies".

Inspec Abstract No. 4258051, from Rundensteiner et al., 1992, "Set Operations in Object–Based Data Models".

Inspec Abstract No. 4244023, from George et al., 1991, "An Object–Oriented Data Model to Represent Uncertainty in Coupled Artificial Intelligence–Database Systems".

Inspec Abstract No. 4234438, from Madany et al., 1991, "Organizing and Typing Persistent Objects Within an Object–Oriented Framework".

Inspec Abstract No. 4152687, from M. Wolczko, 1992, "Encapsulation, Delegation and Inheritance in Object–Oriented Languages".

Inspec Abstract No. 4117514, from Wuwongse et al., 1991, "An Object–Oriented Approach to Model Management".

Inspec Abstract No. 4111396, "Choices, Frameworks and Refinement", R. H. Campbell et al., 1991.

Inspec Abstract No. 4090970, from P. Kougiouris, 1991, "Device Management Framework for an Object–Oriented Operating System".

Inspec Abstract No. 4077440, from A. Mahler, 1991, "Organizing Tools in a Uniform Environment Framework".

Inspec Abstract No. 4067033, from Shaw et al., 1990, "Experience with the ET++ Application Framework".

Inspec Abstract No. 4060084, from Muller et al., 1990, "ODICE: Object–Oriented Hardware Description in CAD Environment".

Inspec Abstract No. 4050569, from Di Giovanni et al., 1990, "Hood Nets".

Inspec Abstract No. C91072815, from Holtkamp et al, 1990, "DEMOM–A Description Based Media Objects Data Model".

Inspec Abstract No. C91072016, from A. Lane, 1991, "/DOS/C++–Application Frameworks".

Inspec Abstract No. C91072574, from Hemery et al., "An Analysis of Communication and Multiprogramming in the Helios Operating System".

Inspec Abstract No. C91064787, from Madany et al, 1989, "A Class Hierarchy for Building Stream–Oriented File Systems".

Inspec Abstract No. C91058815, from Menga et al., 1990, "G++: An Environment for Object Oriented Analysis and Prototyping".

Inspec Abstract No. B91052096, from Cusack et al., 1990, "Object–Oriented Specification in LOTOS and Z, or My Cat Really is Object–Oriented!".

Inspec Abstract No. C91053475, from Queinnec et al., 1998, "An Open Ended Data Representation Model for EU–LISP".

Inspec Abstract No. C91053151, from E. Cusack 1991, "Refinement, Conformance and Inheritance".

Inspec Abstract No. C91042802, from T. Yokoyama, 1990, "An Object–Oriented and Constraint–Based Knowledge Representation System for Design Object Modeling".

Inspec Abstract No. C91041980, from Choi et al., 1991, "Graph Interpretation of Methods: A Unifying Framework for Polymorphism in Object–Oriented Programming".

Inspec Abstract No. C91042655, from Q. Li, 1991, "Extending Semantic Object Model: Towards More Unified View of Information Objects".

Inspec Abstract No. C91024852, from Pierra et al., 1990, "An Object Oriented Approach to Ensure Portability of CAD Standard Parts Libraries".

Inspec Abstract No. C91010951, from T. Helton, 1990, "Level5 Object".

Inspec Abstract No. B90075006, from Gossain et al., 1989, "Designing a Class Hierarchy for Domain Representation and Reusability".

Inspec Abstract No. C91003997, from J. Muys–Vasovic, 1989, "MacApp: An Object–Oriented Application Framework".

Inspec Abstract No. C91004708, from Bertino et al., 1990, "Optimization of Queries Using Nested Indices".

Inspec Abstract No. C90052277, from I. Tervonen, 1990, "Object–Oriented Development as a Multiview Software Construction Methodology".

Inspec Abstract No. C90052627, from Schrefl et al., 1988, "A Knowledge–Based Approach to Overcome Structural Differences in Object Oriented Database Integration".

Inspec Abstract No. C90047457, from Yokoyama et al., 1990, "A Constraint–Based and Object–Oriented Knowledge Representation".

Inspec Abstract No. C90030609, from Forde et al., 1990, "Object–Oriented Finite Element Analysis".

Inspec Abstract No. C89062837, from Pasquier–Boltuck et al., 1988, "Prototyping an Interactive Electronic Book System Using an Object–Oriented Approach".

Inspec Abstract No. C89056727, from Campbell et al., 1989, "Principles of Object–Oriented Operating System Design".

Inspec Abstract No. C89056859, from Hull et al, 1989, "On Accessing Object–Oriented Databases: Expressive Power, Complexity, and Restrictions".

Inspec Abstract No. C89049257, from Madany et al., 1989, "Class Hierarchy for Building Stream–Oriented File Systems".

Inspec Abstract No. C89039001, from Brophy et al., 1989, "A Framework for Multiple, Concurrent Graphical Representation".

Inspec Abstract No. C89033226, from Corradi et al., 1988, "PO: An Object Model to Epxress Parallelism".

Inspec Abstract No. C89014870, from R. King, 1988, "Semantic and Object–Oriented Database Support for Software Environments".

Inspec Abstract No. 89003142, from Tenma et al., 1986, "A System for Generating Language–Oriented Editors".

Inspec Abstract No. C88013915, from Woelk et al., 1987, "Multimedia Information Management in an Object–Oriented Database System".

Inspec Abstract No. C88007447, from P. Allen, 1987, "A Framework for Implementing Multisensor Robotic Tasks".

Inspec Abstract No. C87007043, from Whitted et al., 1986, "Exploiting Classes in Modeling and Display Software".

Inspec Abstract No. C86039599, from K. Fukunaga., 1985; "Prompter: A Knowledge Based Support Tool for Code Understanding".

Inspec Abstract No. C86024804, from Greenspan et al., 1986, "A Requirements Modeling Language and Its Logic".

Inspec Abstract No. C84005713, from Meyer et al., 1983, "Towards a Two–Dimensional Programming Environment".

Inspec Abstract No. C81005505, from Mylopoulos et al., 1980, "Some Features of the TAXIS Data Model".

* cited by examiner

OBJECT ORIENTED FRAMEWORK MECHANISM FOR CUSTOMIZATION OF OBJECT ORIENTED FRAMEWORKS

BACKGROUND OF THE INVENTION

1. Technical Field

The present invention relates in general to the data processing field. More specifically, the present invention relates to the field of object oriented framework mechanisms.

2. Related Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the software programs designed for these high performance systems have become more powerful. Additionally, software development costs have continued to rise because more powerful and complex programs take more time, and hence more money, to produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a group of well-tested objects,, a more stable, uniform, and consistent approach to developing new computer programs can be achieved.

Recent development efforts have produced a host of object oriented frameworks that perform a variety of different functions. A framework typically includes a core portion that cannot be modified by a framework user, and a user-extensible portion that allows a user to customize the framework and to generate from the framework a custom software application. The framework user (or customizer) must extend the extensible portions of the framework to produce the desired customized software. The manner of extending a framework depends on many factors, including the programming language used, the types of extensions supported, the particular extension points provided in the framework, etc.

The task of framework customization can be a complex one. The success or failure of many frameworks in the marketplace has rested upon the complexity of the customization and extension of the framework. Some have recognized the problems of extending a complex framework, and have provided solutions such as: 1) education courses about how to customize a particular framework; 2) documentation on how to customize a particular framework; and 3) tools to guide a framework customizer through the customization process for a particular framework. All of these solutions are specifically targeted to the customization of a single framework. As of yet, no industry standards have been widely accepted that define a uniform interface for frameworks. Thus, a framework user must become trained using one or more of the three training techniques above to customize a particular framework. Unfortunately, this knowledge will not likely apply to the customization of the next framework, and the education process will begin again with each new framework to be extended. Without a mechanism that allows a framework user to easily customize many different object oriented frameworks, industry will never fully realize the power and flexibility of object oriented frameworks.

DISCLOSURE OF INVENTION

According to the present invention, an object oriented framework mechanism for customization of object oriented frameworks provides an infrastructure that embodies the steps necessary to customize a selected object oriented framework (referred to herein as an "input framework"). Combining core functions provided by the framework with extensions provided by the framework consumer (i.e., user), results in a framework customization environment. The architecture of the framework allows a user to determine the conditions and parameters that apply to the specific framework customization environment while allowing the user to interact with the framework using an interface that is consistent regardless of the specific combination of parameters specified by the user. The extensible functions allow new framework customization environments to be easily implemented using the framework. The framework thus allows a common programming interface for generating many different framework customization environments, and also provides a substantially common user interface for customizing any input framework. An input framework is selected, and a subset of its extension points are identified for customization. The framework consumer interacts with the framework customization environment to complete these extensions. Each extension point generates one or more extensions, which are added to the customized framework. The customized framework may then be saved, and may be used to generate a customized application.

The framework mechanism of the present invention was designed and constructed using object-oriented technology. Those who are unfamiliar with object-oriented technology, or with object-oriented framework mechanisms, should read the object-oriented overview section of the Description of the Preferred Embodiments.

DESCRIPTION OF THE PREFERRED EMBODIMENTS

Overview—Object-Oriented Technology

Figure 1:
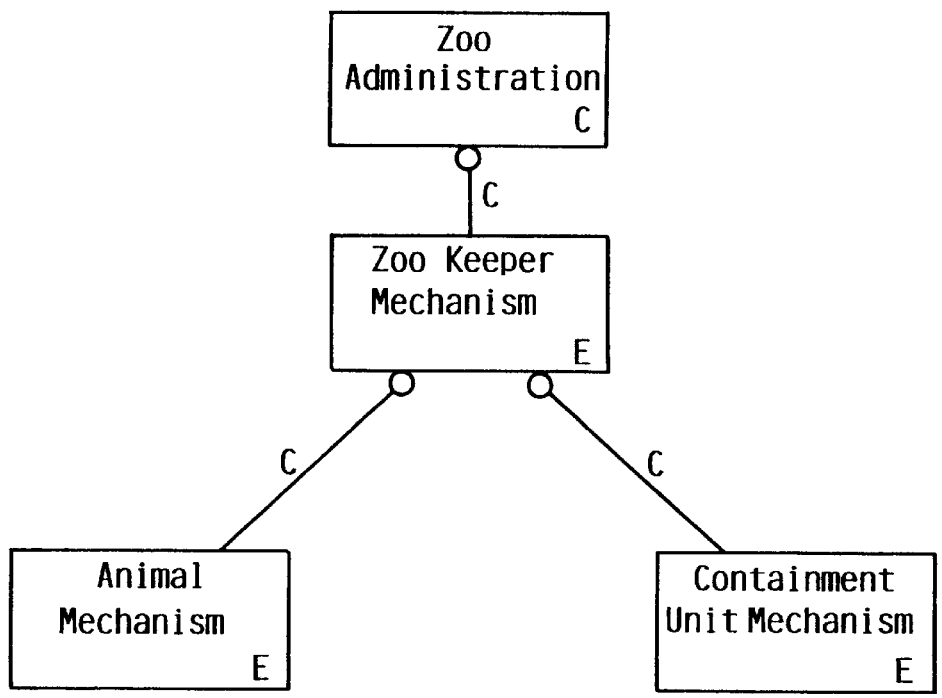
FIG. 1 is a category diagram of an example framework mechanism.

As discussed in the Summary section, the present invention was developed using Object-oriented (OO) framework technology. Individuals skilled in the art of OO framework technology may wish to proceed to the Detailed Description section of this specification. However, those individuals who are new to framework technology, or new to OO technology in general, should read this overview section in order to best understand the benefits and advantages of the present invention.

Object-oriented Technology v. Procedural Technology

Though the present invention relates to a particular OO technology (i.e., OO framework technology), the reader must first understand, that, in general, OO technology is significantly different than conventional, process-based technology (often called procedural technology). While both technologies can be used to solve the same problem, the ultimate solutions to the problem are always quite different. This difference stems from the fact that the design focus of procedural technology is wholly different than that of OO technology. The focus of process-based design is on the overall process that solves the problem; whereas, the focus of OO design is on how the problem can be broken down into a set of autonomous entities that can work together to provide a solution. The autonomous entities of OO technology are called objects. Said another way, OO technology is significantly different from procedural technology because problems are broken down into sets of cooperating objects instead of into hierarchies of nested computer programs or procedures.

The Term Framework

There has been an evolution of terms and phrases which have particular meaning to those skilled in the art of OO design. However, the reader should note that one of loosest definitions in the OO art is the definition of the: word framework. The word framework means different things to different people. Therefore, when comparing the characteristics of two supposed framework mechanisms, the reader should take care to ensure that the comparison is indeed "apples to apples." As will become more clear in the forthcoming paragraphs, the term framework is used in this specification to describe an OO mechanism that has been designed to have core function and extensible function. The core function is that part of the framework mechanism that is not subject to modification by the framework purchaser. The extensible function, on the other hand, is that part of the framework mechanism that has been explicitly designed to be customized and extended by the framework purchaser.

OO Framework Mechanisms

While in general terms an OO framework mechanism can be properly characterized as an OO solution, there is nevertheless a fundamental difference between a framework mechanism and a basic OO solution. The difference is that framework mechanisms are designed in a way that permits and promotes customization and extension of certain aspects of the solution. In other words, framework mechanisms amount to more than just a solution to the problem. The mechanisms provide a living solution that can be customized and extended to address individualized requirements that change over time. Of course, the customization/extension quality of framework mechanisms is extremely valuable to purchasers (referred to herein as framework consumers) because the cost of customizing or extending a framework is much less than the cost of a replacing or reworking an existing solution.

Therefore, when framework designers set out to solve a particular problem, they do more than merely design individual objects and how those objects interrelate. They also design the core function of the framework (i.e., that part of the framework that is not to be subject to potential customization and extension by the framework consumer) and the extensible function of the framework (i.e., that part of the framework that is to be subject to potential customization and extension). In the end, the ultimate worth of a framework mechanism rests not only on the quality of the object design, but also on the design choices involving which aspects of the framework represent core function and which aspects represent extensible function.

ZAF—An Illustrative Framework Mechanism

While those skilled in the art appreciate that framework design is necessarily an intertwined and iterative process, example design choices for a simplistic framework mechanism are set forth in the paragraphs that follow. It should be understood, though, that this is only an example framework that is being used in this specification to illustrate and best explain framework mechanisms such that the reader can understand and appreciate the benefits and advantages of the present invention.

Framework designers determine what objects are needed for a framework mechanism by selecting objects from what is called the problem domain. The problem domain is an abstract view of the specific problem at hand. The example problem domain chosen for this illustrative framework mechanism is that of zoo administration. The specific problem is that of designing a mechanism that assists zoo keepers in the care and feeding of zoo animals. In our example of a Zoo Administration Framework (ZAF), an OO framework designer would look to the zoological problem domain and decide that any ZAF would of necessity involve a mechanism that represented the relationship between zoo keepers and animals (i.e., to represent how zoo keepers care for animals). The framework designer would also likely recognize that zoo animals usually live in cages, pens, tanks, and other sorts of containment units. Therefore, our framework designer would start with the idea that the framework would have to involve mechanisms that represented all of these fundamental entities and relationships.

How ZAF is Designed

To begin the design process, our framework designer would likely begin with what is called a category diagram. Category diagrams are used to describe high level framework mechanisms, and how those mechanisms relate to one another. FIG. 1 is a category diagram for the example framework ZAF. The notation used in FIG. 1, and that used in the other figures of this specification, is explained in detail in the Notation section at the end of this specification (pages 21–27). Each mechanism in a category diagram represents groupings of objects that perform a particular function. For the purposes of illustration, assume that our framework designer decides that ZAF should be made up of four high level mechanisms: a zoo administration mechanism, a zoo keeper mechanism, an animal mechanism, and a containment unit mechanism.

As shown in FIG. 1, the zoo administration mechanism has been designed to use the zoo keeper mechanism to administer the zoo. The zoo administration mechanism is therefore said to have a using relationship with the zoo keeper mechanism. (Again, please refer to the notation section of this specification for an explanation of this relationship and the other notation used in this specification.)

As discussed, the zoo administration mechanism has been designed to have responsibility for overall control of ZAF. Accordingly, the zoo administration mechanism is responsible for scheduling the operation, of the zoo keeper mechanism. Note also that our framework designer designed the zoo administration mechanism to be a core function of ZAF, which means that it has been designed such that it will not be subject to potential customization and extension. The C in the category box denotes this fact. Please note further that the uses relationship between the zoo administration mechanism and the zoo keeper mechanism has also been designed such that it is not available for ultimate customization by the framework consumer.

The zoo keeper mechanism has been designed to be generally responsible for the care and feeding of the zoo animals. Accordingly, it uses the animal and containment unit mechanisms to perform its tasks. However, unlike the design of the zoo administration mechanism, our framework designer has designed the zoo keeper mechanism to be extensible function, which again means that the zoo keeper mechanism has been designed to be available for modification and/or extension by the framework consumer to address future care and feeding requirements. This fact is denoted by the E in the zoo keeper mechanism category box.

Our framework designer has designed the animal; mechanism to represent the animal side of the interaction between zoo animals and zoo keepers. Since the animal population in the zoo is something that changes on a regular basis, the animal mechanism has similarly been designed as an extensible function. The containment unit mechanism interacts with the zoo keeper mechanism by representing individual containment units such as pens, tanks, and cages. Like the animal mechanism, the containment unit mechanism has been designed as an extensible function such that it can handle future customization and extension requirements. Please note here, however, that even though the zoo keeper, zoo animal, and containment unit mechanisms have all been designed as extensible function, the relationships between the mechanisms have been designed to be a core function of ZAF. In other words, even though it is desirable to give ZAF's consumers flexibility relative to the zoo keeper, zoo, animal, and containment unit mechanisms, it is not desirable to allow ZAF's consumers to change how these mechanisms relate to one another.

Our framework designer would next design the classes and relationships that make up the mechanisms shown on FIG. 1. A class is a definition of a set of like objects. As such, a class can be thought of as an abstraction of the objects or as a definition of a type of object. From the view of a computer system, a single object represents an encapsulated set of data and the operation or a group of operations that are performed by a computer system upon that data. In fact, in a secure computer system, the only access to the information controlled by an object is via the object itself. This is why the information contained in an object is said to be encapsulated by the object.

Each class definition comprises data definitions that define the information controlled by the object and operation definitions that define the operation or operations performed by objects on the data that each object controls. In other words, a class definition defines how an object acts and reacts to other objects by defining an operation or set of operations that is/are performed on the defined data. (Please note that operations are sometimes called methods, method programs, and/or member functions.) When taken together, the defined operation(s) and data are said to be the behavior of the object. In essence, then, a class definition defines the behavior of its member object or objects.

Figure 2A:
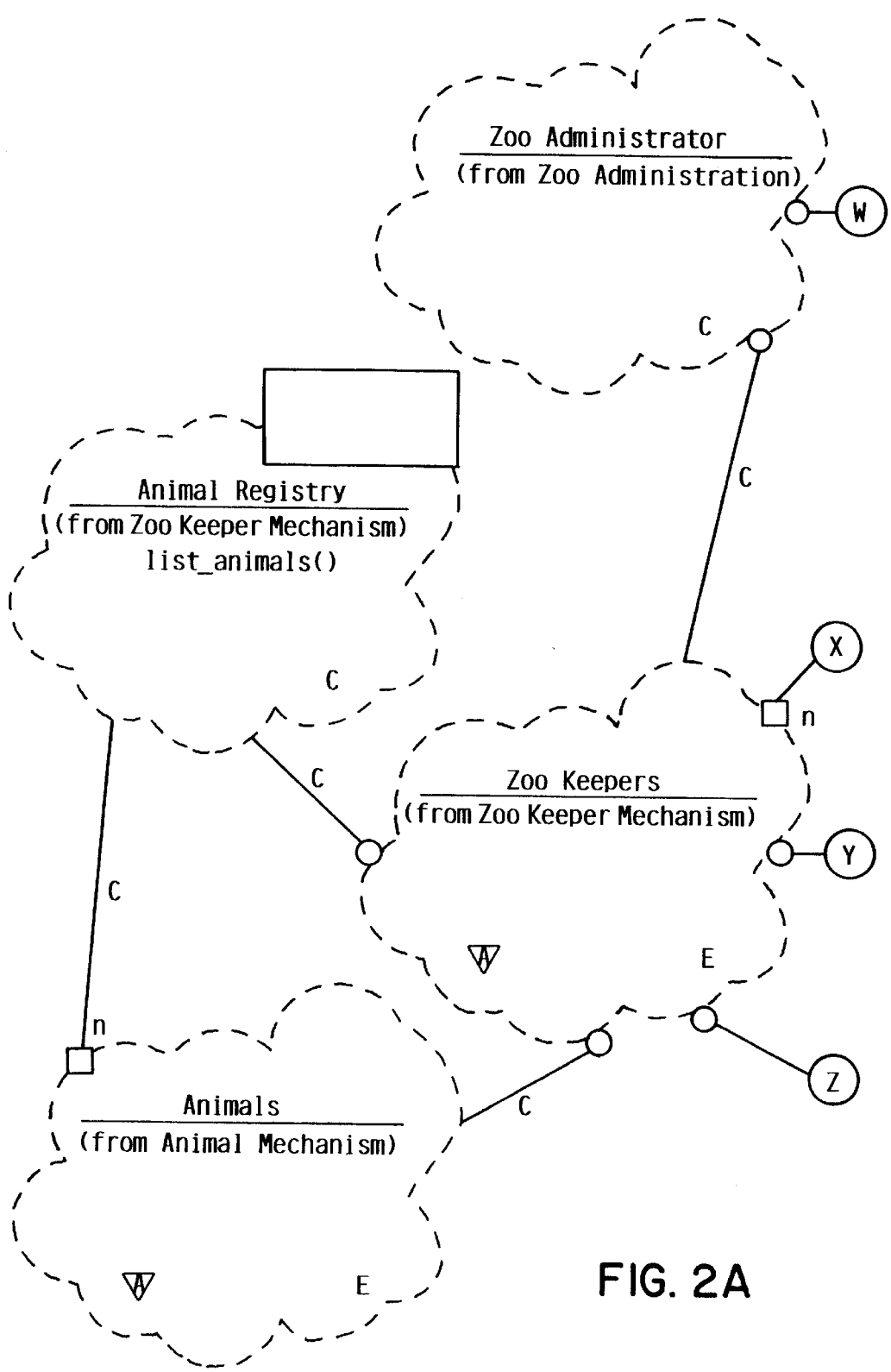
FIGS. 2 through 6 are class diagrams for the example framework mechanism of FIG. 1.
Figure 2B:
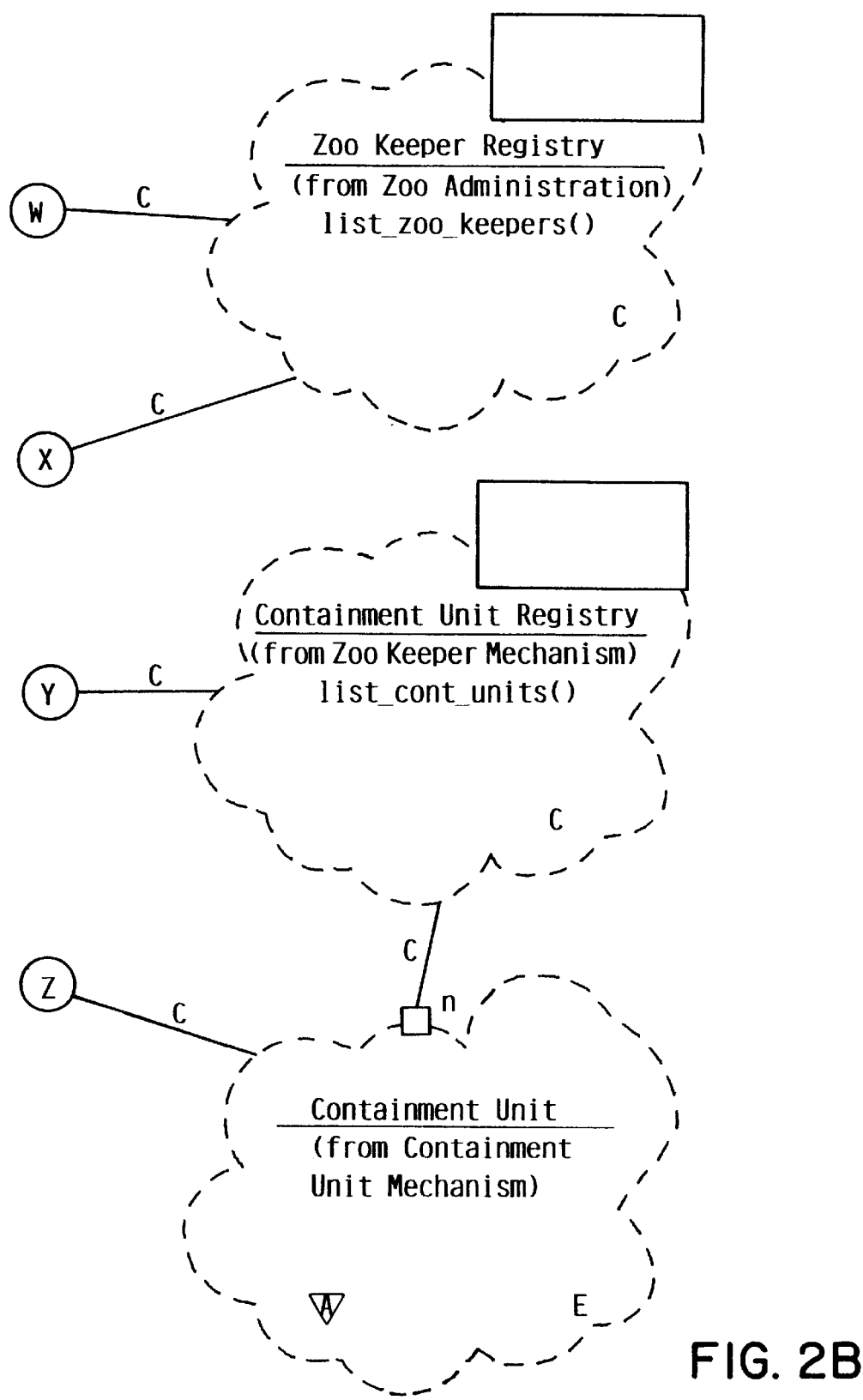

FIG. 2 is an OO class diagram that shows the fundamental classes that our framework designer has designed for ZAF. Each class representation includes its relationship to the mechanisms shown on FIG. 1. For example, we can see that the zoo keepers class is denoted as being from Zoo Keeper Mechanism. The fundamental classes of ZAF include: the zoo administrator class, which is part of the zoo administration mechanism; the zoo keeper registry class, which is also part of the zoo administration mechanism; the animal registry class, which is part of the zoo keeper mechanism; the zoo keepers class, which is also part of the zoo keeper mechanism; the containment unit registry class, which is also part of the zoo keeper mechanism; the animals class, which is part of the animal mechanism; and the containment unit class, which is part of the containment unit mechanism.

Please note again that the relationships between the classes have been designed as core function of ZAF such that they are not available for ultimate modification by ZAF's consumers.

The zoo administrator class is the definition of the object that is responsible for the overall control of ZAF. Again, OO classes only define the objects that interact to provide a solution to the problem. However, it is by exploring the characteristics of the class definitions that we are able to understand how the objects of the framework mechanism have been designed to provide a living solution that can be customized and/or extended to address future requirements.

The zoo administrator class has been designed to have a uses relationship with the zoo keeper registry. Our framework designer has designed the zoo administrator and zoo registry classes to be a core function of ZAF because our designer has decided that ZAF's consumers should not be allowed to modify the behavior of objects that are members of these class definitions. The zoo keeper registry, which has what is called a contains by reference relationship with the zoo keeper class, is simply a class that defines an object that is a container for all zoo keeper objects. Accordingly, the zoo keeper registry includes a definition for a list_zoo_keepers( ) operation. As will be described later, this operation is responsible for providing a list of zoo keeper objects to other objects that request such a list.

Figure 3:
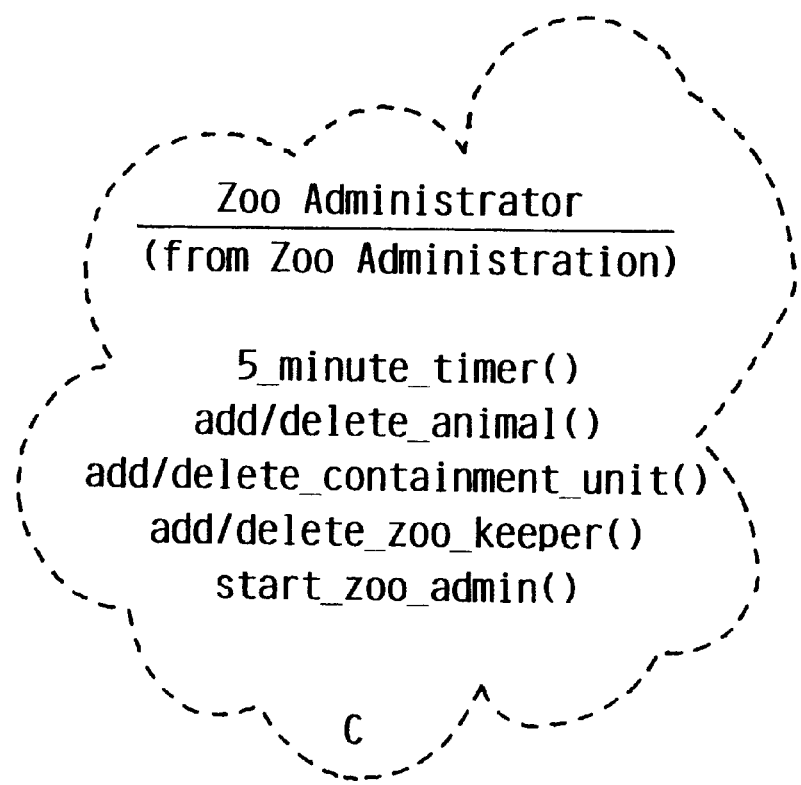

FIG. 3 shows a lower level view of the zoo administrator class. Since objects of type zoo administrator have responsibility for overall control of ZAF, the zoo administrator class has been designed to include operations that perform tasks oriented towards zoo administration. The class definition includes the following five operations: $5_{minute}$_timer( ), add_animal( ), add_containment_unit( ), add_zoo keeper( ), and start_zoo_admin( ).

The start_zoo_admin( ) operation is responsible for starting ZAF. That is, a user or system administrator will interact with the start_zoo_admin( ) operation to begin administration of a zoo via ZAF. Once started, our framework designer has designed the start_zoo_admin( ) operation to initiate the $5_{minute}$_timer( ) operation. Every five minutes, the 5_minute_timer( ) operation instructs the zoo keeper objects to go out and check on the animals. The add/delete zoo_keeper operation is responsible for interacting with users of ZAF to define additional zoo keepers (i.e., additional zoo keeper classes), to add additional zoo keepers (i.e., zoo keeper objects), and to remove zoo keeper classes and/or objects. As will become clear in the forthcoming paragraphs, each zoo keeper object is responsible for performing a particular zoo task. Therefore, it is natural that a user of ZAF might well want to add a zoo keeper definition and object to handle an additional zoo task or to remove a definition or object that is no longer needed. As will be seen, this flexibility is provided by designing the zoo keeper mechanism as an extensible function.

Like the add/delete_zoo_keeper operation, the add/delete_animal( ) operation is responsible for interacting with users to define additional zoo animal classes and objects and to remove classes and objects that are no longer needed. Again, it is quite natural for a zoo to need to add and remove animals. The add/delete_containment_unit( ) operation is responsible for the definition of new containment_unit classes and objects and for removal of classes and/or objects that are no longer necessary. Again, our framework designer has designed ZAF in a way that provides this flexibility by designing the animal and containment unit mechanisms as extensible functions.

Referring back to FIG. 2, the zoo keepers class definition has a uses relationship with the animal registry, animals, containment unit registry, and containment units classes. Since the value of ZAF is enhanced by allowing ZAF's consumers to customize and extend the zoo keepers, animals, and containment unit classes, these classes have been designed as extensible function. However, changing the behavior of the animal and containment unit registry classes would disrupt the basic operation of ZAF. Therefore, these classes have been designed to be core functions of ZAF.

While the classes and categories within ZAF have been described as either core functions or extensible functions, it is important to note that the term "core function" as used herein broadly relates to requirements that cause the framework to operate in the desired manner. In simple terms, core functions of a framework are the functions that any program that uses the framework will perform. The requirements of core functions may be imposed by the structure of the framework (e.g., by designating certain classes as core functions) or may be imposed by functional requirements that dictate how a framework consumer may utilize the framework. Thus, core functions include not only the classes and class relationships that are designated as core, but may also include extensible classes that must be implemented in particular ways for the framework to function properly. Said another way, while extensible function is that part of the framework that is designed to be customized by the framework consumer, the nature and extent of the customization is governed by the requirements of the framework's core function (i.e., the overall framework function imposed by the structure and functional requirements of the framework). For example, the animals class has been designed as extensible function of ZAF so that ZAF can be customized to accommodate different types of animals. However, the ability to customize the extensible animals class does not imply that the nature of the customization can violate the basic structure imposed by the core function of ZAF (e.g., by customizing the animal class to the extent that it can no longer be reasonably said to represent a type of animal).

Figure 4:
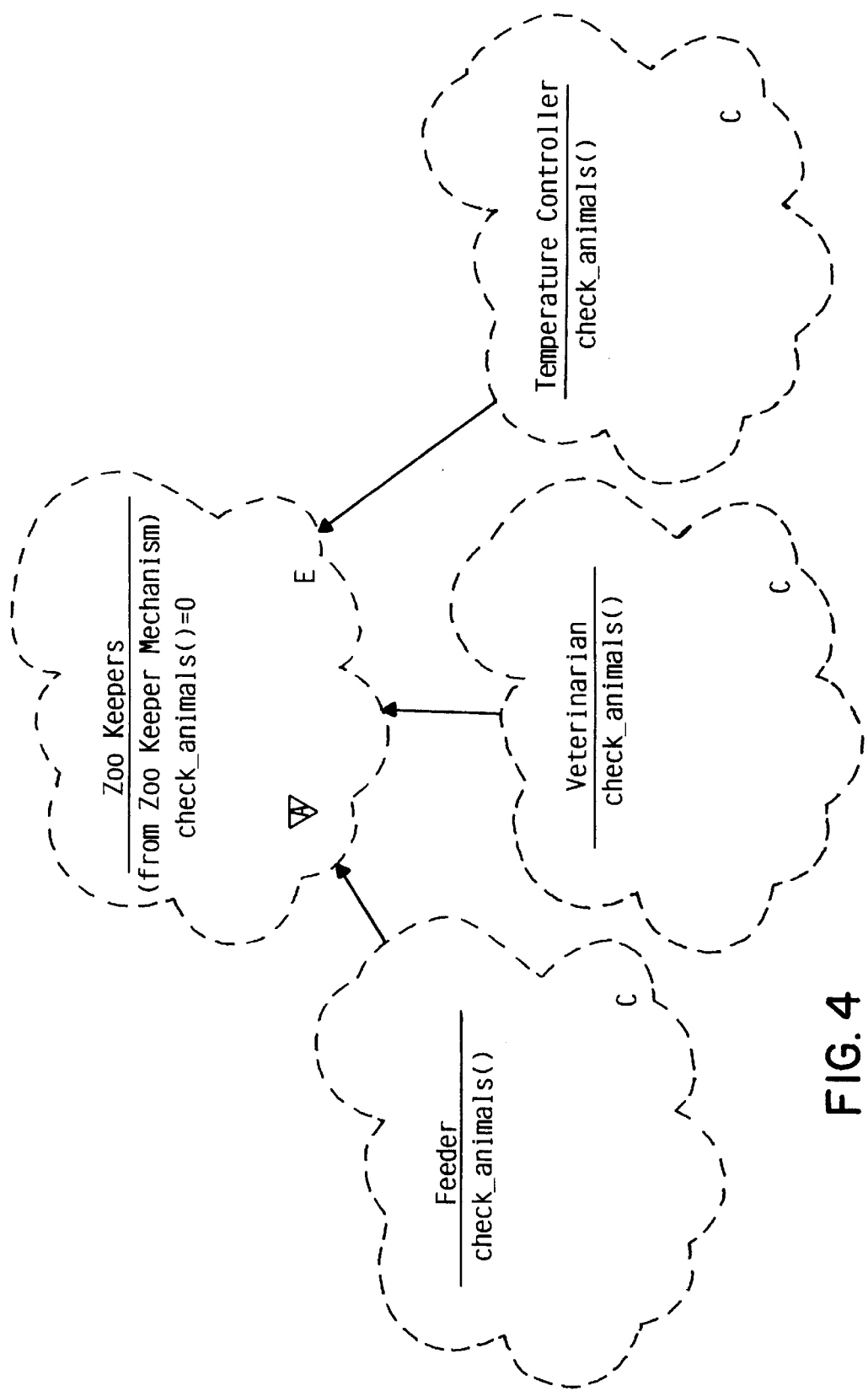

FIG. 4 is a class diagram of the zoo keeper class. However, before describing the details of FIG. 4, it is worthwhile to point out that the class definitions shown on FIG. 4 are ranked in a very simple ordering called a class hierarchy. A class, like the zoo keeper class, that represents the most generalized/abstract class in a class hierarchy is referred to as the base class of the hierarchy. The ordering of classes in a class hierarchy goes from most general to least general (i.e., from general to sp ecific). Less general classes (e.g., the feeder class) are said to inherit characteristics from the more general class or classes (i.e., the zoo keeper class in this case). As such, class definitions feeder, veterinarian, and temperature controller are said to be subclasses of the zoo keeper class. Inheritance mechanisms will be explored in more detail in the discussion associated with FIG. 5.

As shown on FIG. 4, the zoo keeper class definition contains a single operation definition, the check_animals( ) operation definition. The reader should also note that the zoo keepers class definition is marked as being an abstract class. Abstract classes are not designed to have objects created as their members, but are instead used to define a common interface/protocol for their subclasses. A class is said to be an abstract class when at least one of its operation definitions is a pure virtual operation definition. Pure virtual operation definitions are designed for the sole purpose of defining a common interface for subclass definition of that operation. In other words, the design of the actual behavior (i.e., the data and operations) is left to the subclasses themselves. In the case of the zoo keeper class definition, the feeder, veterinarian, and temperature controller subclasses define specific implementations of the pure virtual check_animals( ) operation definition that is contained in the zoo keeper class. An operation is marked as a pure virtual when it is set equal to 0.

It is important to note, though, that the common interface of a pure virtual operation definition must be honored by all subclasses such that requesting objects (called client objects) can use subclass member objects (called server objects) without needing to know the particular subclass of the server object. For example, whenever the object defined by the zoo administrator class needs a particular action performed, it interacts with a zoo keeper object. Because the interface to these objects was defined in abstract, base class zoo keeper and preserved in the subclass definitions for the check_animals( ) operation, the zoo administrator object need not have special knowledge about the subclasses of any of the server objects. This has the effect of decoupling the need for the action (i.e., on the part of the zoo administrator object) from the way in which the action is carried out (i.e., by one of the objects of the zoo keepers subclasses). Designs (like the ZAF design) that take advantage of the characteristics of abstract classes are said to be polymorphic.

Polymorphism is extremely important to OO framework design because it allows the way in which something is done (called the implementation) to be changed or extended without effecting the mechanisms that depend on the fact the action is actually performed. In other words, client objects need only understand that certain objects perform certain functions, not how those functions are actually carried out. This is one way in which a properly designed framework can be readily customized and extended to satisfy future requirements.

Figure 5:
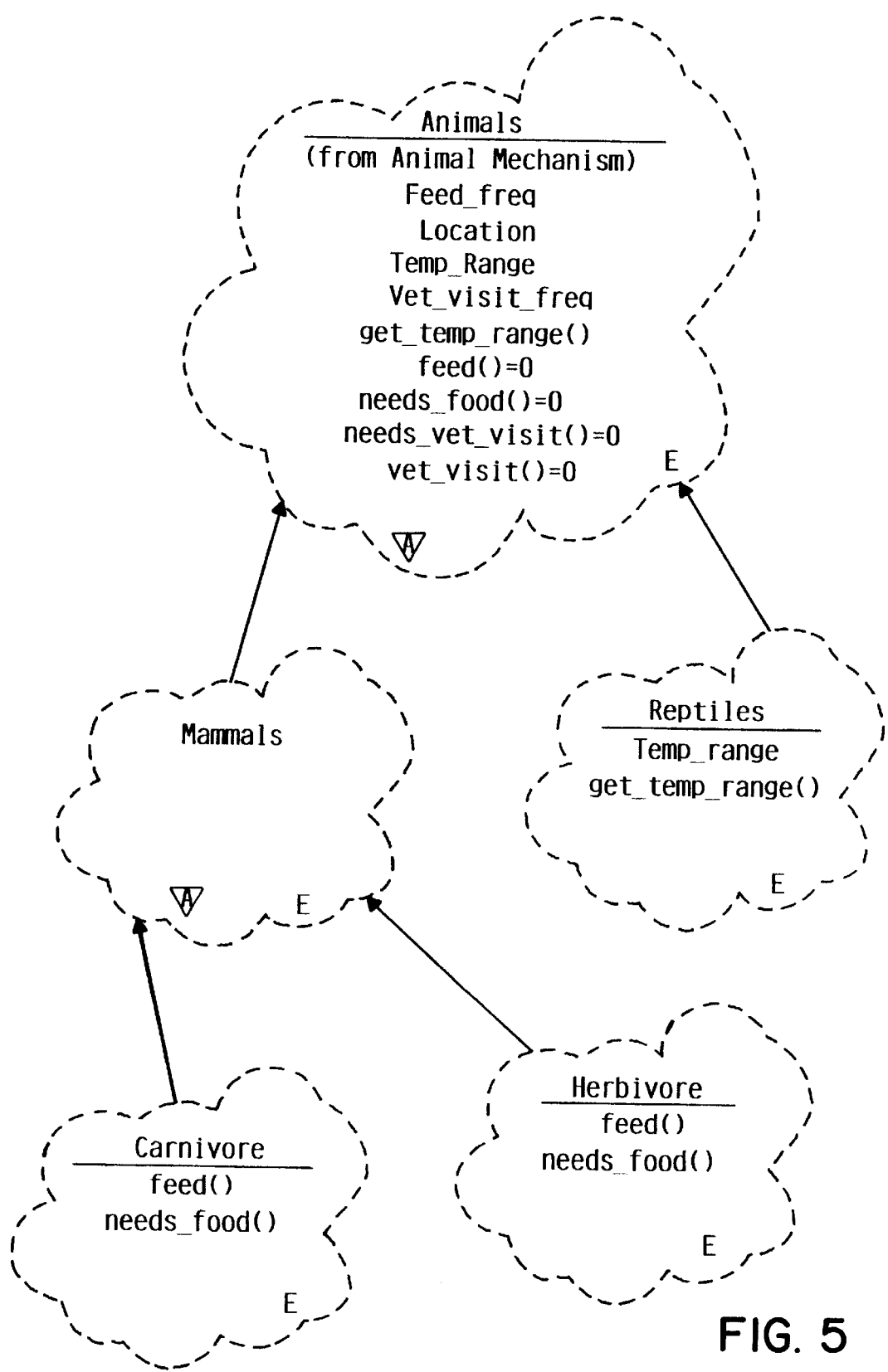

As previously discussed, our framework designer has designed ZAF such that zoo keeper objects interact with animal and containment unit objects to perform their tasks. FIG. 5 is a class diagram for the class hierarchy of the abstract class animal. Since the animals class definition is responsible for representing the characteristics and behavior of zoo animals, the framework designer has designed abstract class animal in a way that reflects this responsibility. As shown, the example animal class definition includes data definitions feed_freq, location, and temp_range and; operation definitions get_temp_range( ), feed( ), needs_food( ), needs_vet_visit( ), and vet_visit( ).

For the purposes of this framework overview, it is not necessary to explore each definition in detail. However, the temp_range data definition and the get_temp_range( ) and feed( ) operation definitions are good examples of well thought out framework design choices.

The feed( ) operation definition is designed to perform the actual feeding of the animals (i.e., through specific feeding apparatus which is not shown). The feed( ) operation is a pure virtual operation. Again, this means that the design of the class is such that the actual mechanism that performs the needed function has been left to be defined by the subclasses. Requiring subclass definition is a good design choice in cases like this where objects that are created as members of the subclasses have particularized needs. In ZAF, for example, each type of animal is likely to have need for a particularized feeding apparatus, which not only makes definition of a generic feed( ) operation difficult, but valueless.

By way of comparison, the framework designer has explicitly designed the get_temp_range( ) operation such that it is not a pure virtual operation definition. This means that get_temp_range( ) has been generically defined as a default operation. As such, it is considered a virtual operation. Default operations are used to provide generic function to subclasses. The subclasses can simply u:se the default operations or they can customize or extend the default operations by redefinition. Redefinition of a default operation is called overriding the default operation.

Mammals is a subclass of class animals, and as such, mammals inherits all of the characteristics of class animals. Please note that class mammals is also designed as an abstract class, which again means that it has not been designed to have objects created as its members, but has instead been designed to provide a common interface for its subclasses. Subclass mammal is further subclassed into classes carnivore and herbivore.

Since definition of the feed( ) operation has been left up to the subclasses, subclasses carnivore and herbivore each have their own definition of the feed( ) operation. Again, this is a good design choice because meat eating carnivores are going to have different needs than their plant eating counterparts.

Temp_range is a data definition for the range of temperatures that coincides with that of the specific animal's natural habitat and the get temp_range( ) operation definition is designed to retrieve the temp_range for a specific animal and return it to a requesting client object. Subclass reptiles contains its own data definition for temp_range and its own definition for the get temp_range( ) operation. ZAF has been designed this way to point out that data definitions can be overridden just like operation definitions. Since many reptiles live in desert conditions, where nights can be very cold and days very hot, the default temp_range definition has been overridden in the reptiles class to include time and temperature information (not explicitly shown on FIG. 5). This is another good design choice because it allows ZAF to treat reptile containment units differently than other containment units by allowing temperature adjustments to be made based on the time of day as well as on the current temperature of the containment unit itself.

Figure 6:
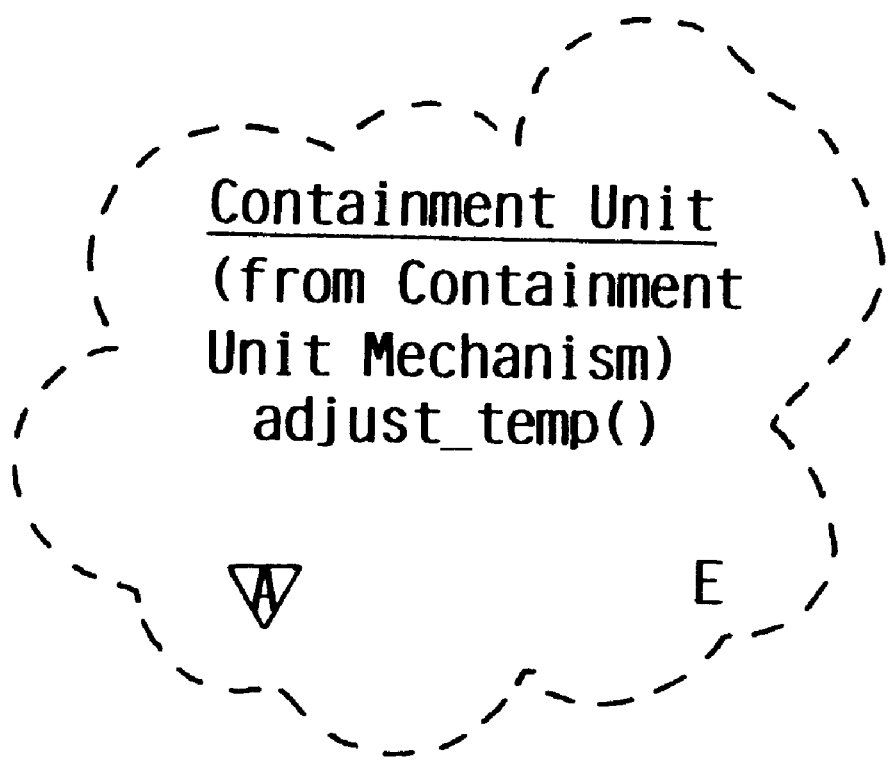

FIG. 6 is a class diagram showing a lower level view of the containment unit class. The containment unit class contains virtual operation definition adjust_temp( ). The adjust_temp definition defines both the interface and mechanism used to actually adjust the temperature in the containment units of the zoo (i.e., via heating and cooling mechanisms which are not shown).

How the ZAF Objects Interact

Beyond designing the objects that make up the solution to the specific problem, our framework designer must also design how the individual objects interrelate. In other words, the objects must interrelate in way that takes advantage of the manner in which they were designed. As discussed, the way in which;the defined operations of an object operate on the data defined for the object is called the object's behavior. While objects may be characterized as autonomous entities, it is still very important that each object exhibit a consistent behavior when interrelating with other objects. Consistent behavior is important because objects depend upon the consistent behavior of other objects so that they themselves can exhibit consistent behavior. In fact, consistent behavior is so important that an object's behavior is often referred to as the contract the object has with the other objects. When an object does not exhibit a consistent behavior, it is said to have violated its contract with the other objects.

When an operation of one object needs access to the data controlled by a second object, it is considered to be a client of the second object. To access the data controlled by the second object, one of the operations of the client will call or invoke one of the operations of the second object to gain access to the data controlled by that object. One of the operations of the called object (i.e., a server operation in this case) is then executed to access and/or manipulate the data controlled by the called object.

Figure 7A:
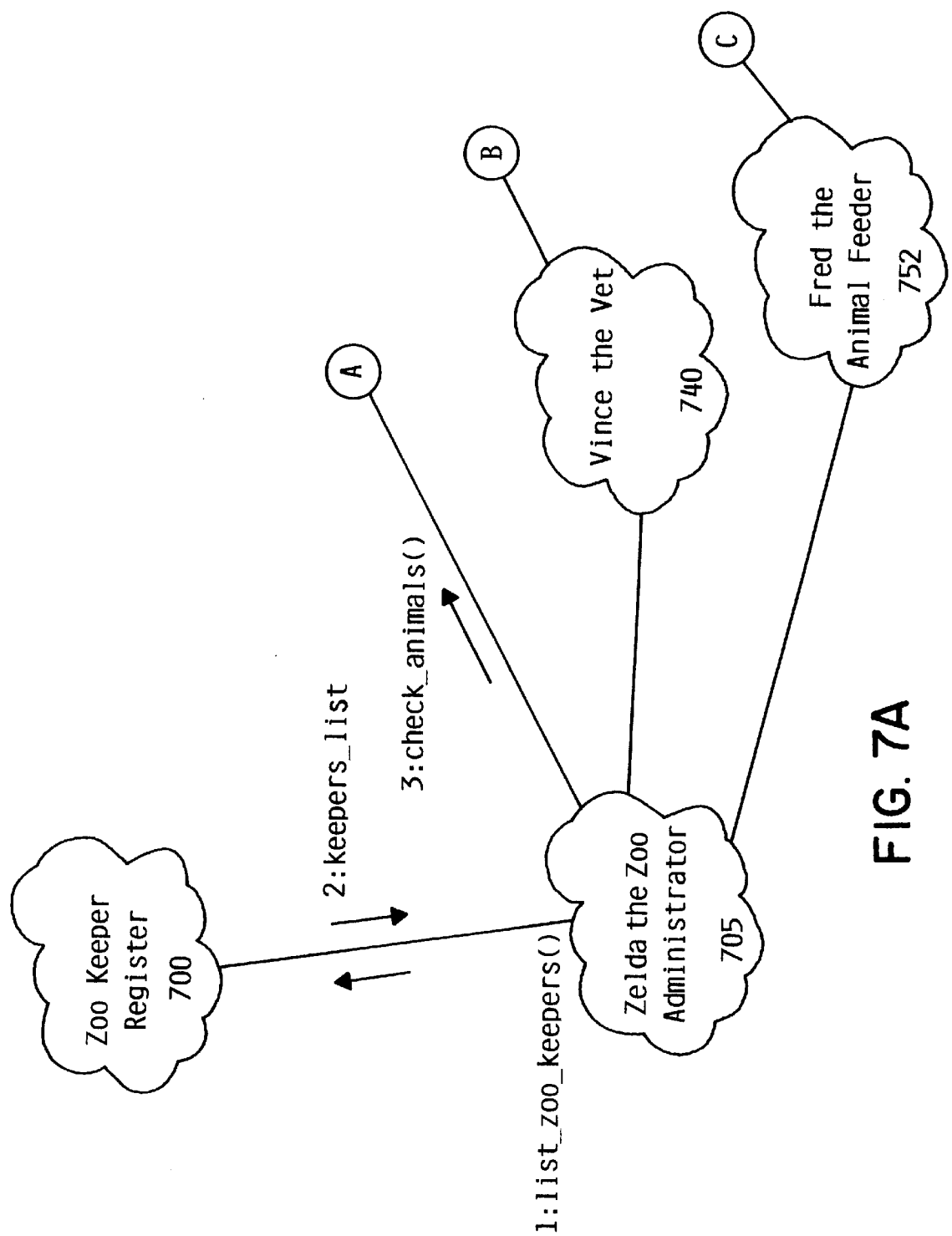
FIG. 7 is an object diagram for the example framework mechanism of FIGS. 1 through 6.
Figure 7B:
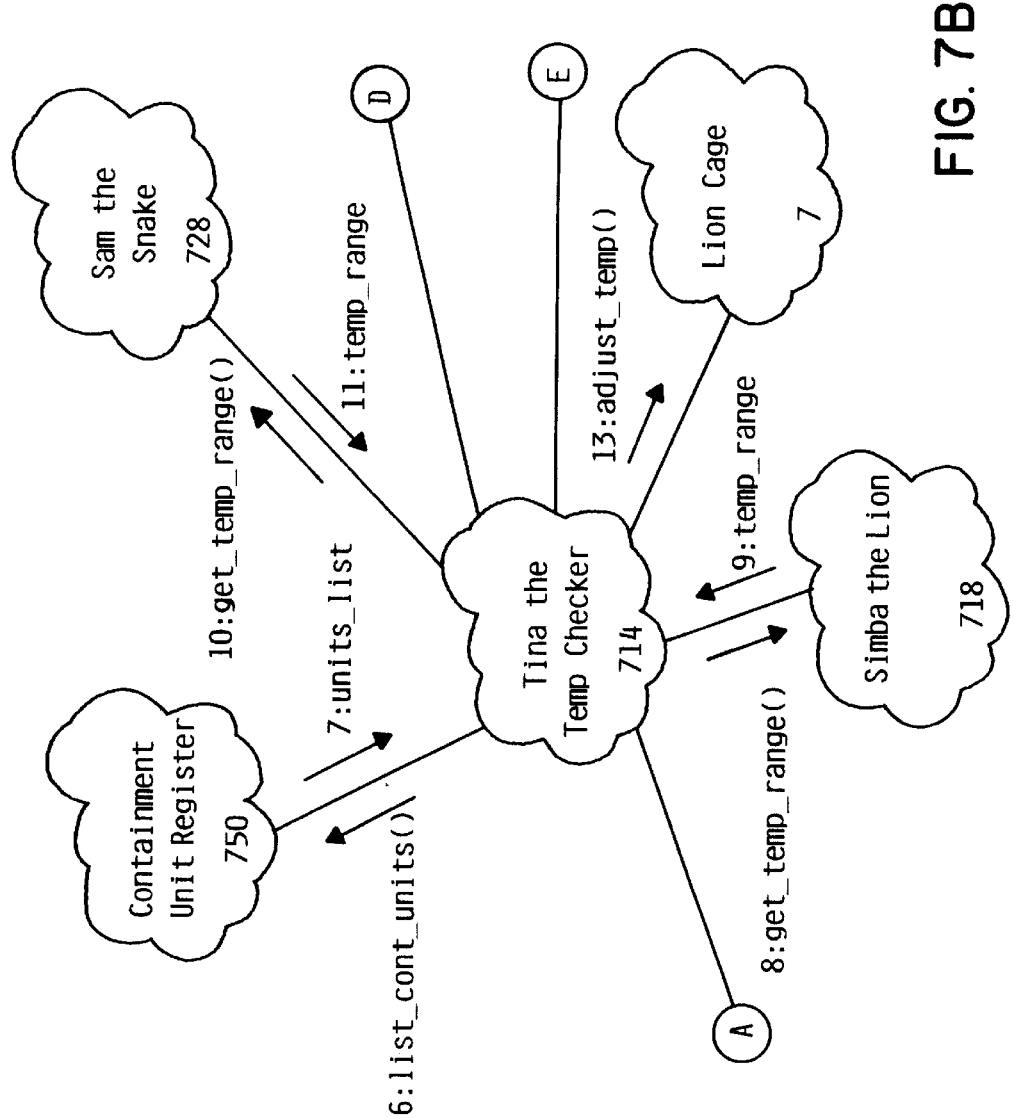
Figure 7C:
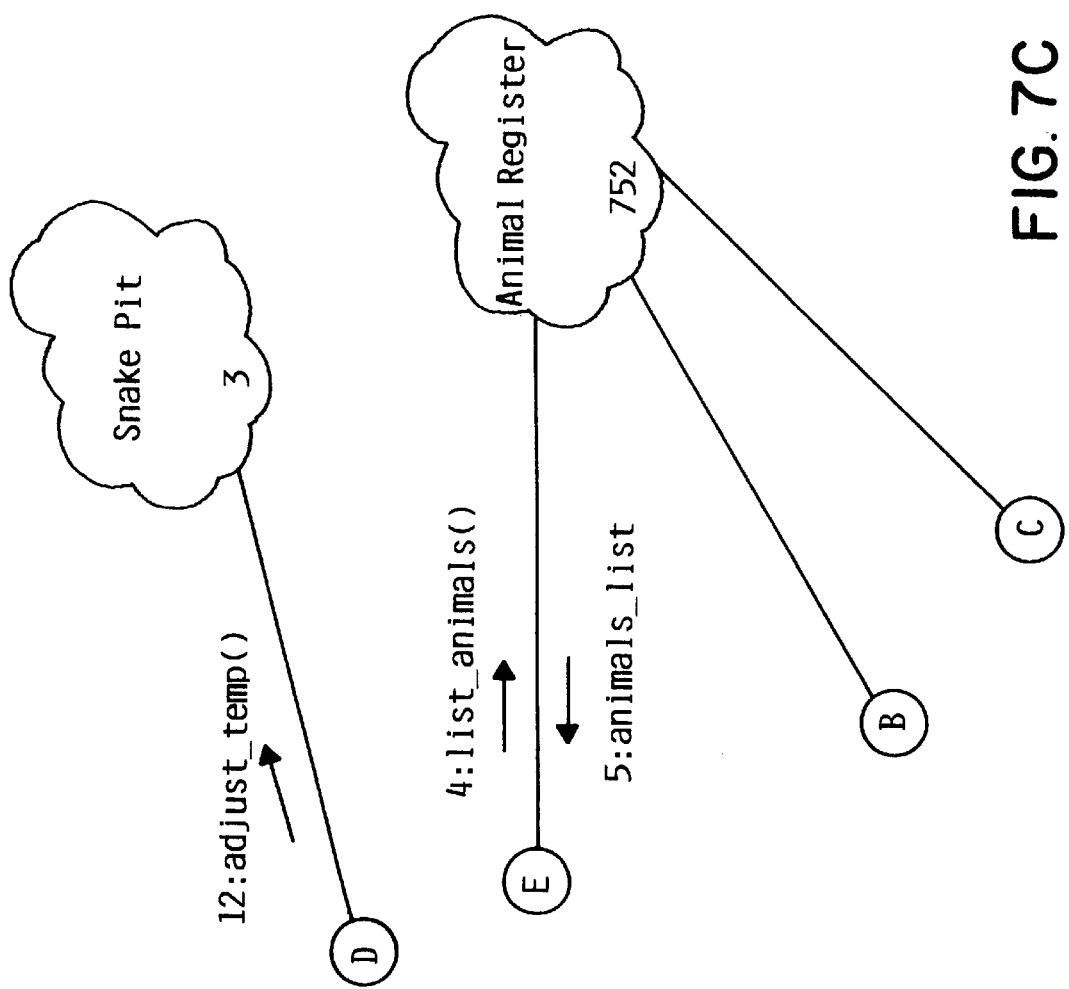

FIG. 7 is an object diagram showing how the example objects of ZAF interact to assist zoo personnel in operating the zoo. A detailed analysis of the interaction of all of the ZAF objects is unnecessary for the purposes of this overview. However, the reader should review the following simple control flow to obtain a rudimentary understanding of how objects interact to solve problems.

As mentioned, an object is created to be a member of a particular class. Therefore, Zelda the Zoo Administrator [object 706] is an object that is a member (actually the only member) of the zoo administrator class. As such, object Zelda is responsible for overall control of ZAF. All of the zoo keeper objects have registered with the Zoo Keeper Register object [object 700]. Therefore, object Zelda obtains a list of the current zoo keepers by calling the list_zoo_keepers( ) operation [step 1] of the Zoo Keeper Register object. The Zoo Keeper Register object has been created as a member of the zoo keeper register class. For the purposes of illustration, assume that this occurs every five minutes as part of Zelda's 5_minute_timer( ) operation. The Zoo Keeper Register object then responds with the zoo keepers list [step 2]. The list of zoo keepers includes Tina the Temperature Checker [object 714], Vince the Vet. [object 740], and Fred the Animal Feeder [object 752]. Each zoo keeper has been created as a member of the zoo keepers class. In particular, objects Tina the Temp. Checker, Vince the Vet., and Fred the Feeder are respectively members of the temperature controller, veterinarian, and feeder subclasses.

Once the list of current zoo keepers has been returned to object Zelda, object Zelda instructs each zoo keeper in the list to check the animals by calling the check_animals( ) operation of each zoo keeper object [only the call to Tina the Temp. Checker is shown—step 3]. Please note that object Zelda did not need to understand the types of zoo keepers that were in the zoo keeper list, the number of zoo keeper objects in the list, or the specialized characteristics of any one zoo keeper object. Object Zelda uses the same interface (i.e., the check_animals( ) operation) to communicate with each zoo keeper object. It is then up to the individual zoo keeper objects to perform the task for which they have been created. Each zoo keeper object performs its assigned task through use of its own check_animals( ) operation. For example, object Tina's check_animals( ) operation retrieves a list of current animals from the animal registry object by calling the list_animals( ) operation [step 4] and then a list of containment units from the containment unit register object by calling the list_cont_units( ) operation [step 6]. Upon examining the animal list, object Tina's check_animals( ) operation determines that there are only two animals currently registered in the zoo, Sam the Snake [object 728] and Simba the Lion [object 718].

Object Tina's check_animals( ) operation then calls the get_temp_range( ) operations to get temperature ranges from objects Sam and Simba [steps 8 and 10]. Once the temperature ranges have been returned, the check_animals( ) operation of object Tina determines which containment units house the respective animals (i.e., Simba and Sam) and then calls the adjust_temp( ) operation of the appropriate containment unit (i.e., Lion Cage 7 in the case of object Simba and Snake Pit 3 in the case of object Sam) to adjust the temperature of the containment units [steps 12 and 13].

The adjust_temp( ) operation of each containment unit then completes the control flow by proceeding to adjust the temperature in a way that is appropriate for the animals contained in each containment unit. (That is, the temperature is adjusted based on time and temperature for Snake Pit 3 and based on time alone for Lion Cage 7.) The reader should note that the relationship between the check_animals( ) operation and the adjust temp( ) operations is polymorphic. In other words, the check_animals( ) operation of object Tina does not require specialized knowledge about how each adjust_temp( ) operation performs its task. The check_animals( ) operation merely had to abide by the interface and call the adjust_temp( ) operations. After that, it is up to the individual adjust_temp( ) operations to carry our their tasks in the proper manner.

At this point, it is again worthwhile to point out that the ZAF mechanism is an extremely simplistic framework mechanism that has been presented here to help novice readers understand some basic framework concepts so as to best appreciate the benefits and advantages of the present invention. These benefits and advantages will become more clear upon reference to the Detailed Description section below.

Notation

There is, as yet, no uniformly accepted notation for communicating object-oriented programming ideas. The notation used in this specification is very similar to that known in the programming industry as Booch notation, after Grady Booch. Mr. Booch is the author of *Object-Oriented Analysis and Design With Applications,* 2nd ed. (1994), available from The Benjamin/Cummings Publishing Company, Inc. Use of Booch notation concepts within this specification should not be taken to imply any connection between the inventors and/or the assignee of this patent application and Mr. Booch or Mr. Booch's employer. The notational system used by Mr. Booch is more fully explained at Chapter 5, pp. 171–228 of the aforementioned book. The notational system used herein will be explained generally below. Other notational conventions used herein will be explained as needed.

A system that is modeled by an object-oriented framework can be represented at a high level of abstraction by a diagram called a top-level class diagram. FIG. 1 of the drawings is an example of a top-level class diagram containing boxes that represent abstractions of the modeled system. The boxes are arranged in a hierarchy such that boxes representing abstractions close to the physical components of the system are at the lower levels of the diagram and boxes representing more abstract, functional components are closer to the top of the diagram. In FIG. 1, the boxes are labeled as "mechanisms" to denote that the abstractions comprise means for implementing modeled system components. The boxes (mechanisms) can be thought of as categories comprising groups of similar classes defined according to object-oriented programming concepts. FIG. 1 represents a zoo administration model and therefore the lower hierarchy boxes include a box called Animal Mechanism, which represents animals within the zoo model, and a box called Containment Unit Mechanism, which represents animal pens and cages. At the highest level of FIG. 1, the box called Zoo Administration represents a functional abstraction that encompasses a variety of administrative tasks that are performed by personnel.

The boxes in a top-level class diagram represent the system abstractions that provide the system behavior. The system abstractions include classes and objects. Details of the system classes are provided in a class diagram that is used to show the class categories and to indicate the relationships and responsibilities of the classes. A class is represented by an irregularly shaped, dashed-line icon commonly referred to a cloud. FIG. 2, for example, shows several classes represented as clouds. Each class is identified by a name that is unique to the associated class category and also indicates the relationship of each class to one of the mechanisms illustrated in FIG. 1. Within a class icon, the class name is listed above attribute names, operation names followed by parentheses, and constraints that are enclosed within brackets. FIG. 3 illustrates the class Zoo Administrator in greater detail. FIG. 3 indicates that the Zoo Administrator class includes multiple operations, including ones called "5_$_{minute}$_timer( )", "add_animal( )", and "add_containment_unit( )". Words in the operation names (and class attribute names) are separated by an underscore for easier reading. An example of a class attribute listing is shown by the attributes called "feed_freq" and "temp_range" in the class Animals illustrated in FIG. 5.

Connecting lines between mechanisms (FIG. 1) and classes (FIG. 2) indicate the nature of the relationships between such respective abstractions. Thus, connections between the boxes in FIG. 1 represent relationships between the various mechanisms. A straight connecting line, for example, represents a simple association relationship indicating shared information. A "using" relationship is a refinement of a simple association whereby one abstraction that is referred to as a server or supplier provides services to another abstraction that is referred to as a client. Such a relationship is indicated by an open circle at one end of a simple association line, the open circle end designating the client that "uses" the associated server.

Another refinement of a simple association between two classes is a type referred to as an inheritance relationship. Inheritance is a relationship among classes in which one class shares the structure and/or behavior associated with one or more other classes. An inheritance association is also referred to as a "is a" relationship. Thus, given two classes A and B, the class A has an inheritance relationship with the class B if A is an example of a B; A is said to be a subclass of B and B is said to be a superclass or parent of A. That is, A "is a" B. An inheritance relationship is denoted with a connecting line that includes an arrowhead at one end to indicate a subclass that derives its characteristics from a parent class at the other end of the line.

Another refinement of class relationships is called an aggregation relationship, which denotes an association between a whole and its parts or attribute classes. In notation, an aggregation relationship is indicated between a whole class and an attribute class connected with an association line by a solid circle at the whole class end, with an attribute class at the other end.

Another relationship specified by a class diagram is an instantiation relationship. An instantiation relationship represents an instance of a class such as a particular implementation of a class as supported by a programming language. For example, a class called "animal" can have multiple instantiations comprising lions, tigers, and bears. An instantiation of a class is represented by a dashed association line with an arrowhead pointing from an instance of a class to the general class.

Finally, a class relationship referred to as a metaclass denotes a relationship in which a class itself is treated as an object that can be: manipulated. That is, a metaclass is a class whose instances are themselves classes. Some computer languages, such as Small Talk, support the concept of a metaclass. Such relationships are denoted by a shaded line with an arrowhead pointing from an instance of a metaclass to the general metaclass.

Classes can be parameterized, which denotes a family of classes whose structure and behavior are defined independently of its formal class parameters. A parameterized class is represented by a cloud-shaped class icon with a rectangular box placed over a portion of the cloud. The parameter list is named within the rectangular box. An instantiated class includes a parameter box, called an adornment, in contrast to a dashed line box for a general class. The instantiation relationship between a parameterized class and its instantiated class is represented as a dashed line pointing to the parameterized class. Typically, an instantiated class requires a "using" relationship to another concrete class for use as an actual parameter.

Properties of classes can be represented by class adornments that are enclosed within the class cloud icon. In particular, an abstract class is denoted by an upper case block "A" within a triangle that is placed within a cloud. An abstract class is a class for which no instances may be created. That is, it is a class of classes. Other class adornments are functions of the OO implementation language. For example, the C++ language permits special class qualifications that will be given special adornments. A static class is represented by an upper case block "S" within an adornment triangle, a friend class is denoted by an upper case block "F" within an adornment triangle, and a virtual class is represented by an upper case block "F" within an adornment triangle.

In addition to defining classes, a designer of an object oriented programming system must define objects (see page 136 of Booch). Objects are represented as solid line clouds within which is placed the object name located above a list of object attributes. An object is an entity that exhibits a well defined behavior. An object is intended to represent some part of a real system that is being represented by the object oriented program. An object is characterized by a state, a behavior, and an identity. An object can be thought of as an instance of a class. The behavior of an object is an indication of how the object acts and reacts in terms of its state changes and its message-passing actions.

Objects and their interrelationships are represented in object diagrams that comprise object icons having links that indicate synchronization between objects. Links are sequentially numbered to indicate the flow of operations. The existence of a link between two objects indicates an association between their corresponding classes and denotes a path of communication between them. Thus, a link between two objects indicates that one object may send messages to another. The direction of message transfer is indicated by adorning a simple connecting line with an arrowhead that points from an object that invokes an operation, referred to as the client, to the object that provides the operation, referred to as the supplier. Such a representation of a simple synchronization relationship denotes the simplest form of message-passing. Such an association can indicate, for example, the invocation of an operation. Operation parameters can be indicated adjacent the linking line.

Some objects may be active, meaning that they embody their own thread of control. That is, such objects are not simply sequential. Active objects may have a variety of concurrency characteristics. If an object has multiple threads of control, then synchronization must be specified. Message synchronization can be synchronous, meaning that the client will wait until the supplier accepts the message. Synchronous synchronization is indicated with an "X" with an arrowhead. Synchronization can encompass balking message-passing, meaning that the client will abandon the message if the supplier cannot immediately service the message. Balking is indicated with an arrowhead turned back on itself. Synchronization can encompass a time-out synchronization, meaning that the client will abandon the message if the supplier cannot service the message within a specified amount of time. Time-out synchronization is indicated with a clock face representation adjacent a linking arrowhead. Finally, synchronization can encompass an asynchronous message, meaning that the client sends an event to a supplier for processing, the supplier queues the message, and the client then proceeds without waiting for the supplier. Those skilled in the art will appreciate that asynchronous message synchronization is analogous to interrupt handling. Asynchronous message synchronization is indicated with a half arrowhead.

It bears mention that the Booch notation includes interaction diagrams that trace the execution of objects and classes. Interaction diagrams are essentially restructured object diagrams. That is, interaction diagrams convey the same information from that conveyed by object diagrams, but simply present the same information in a different format. The present specification makes use of both object diagrams (for the ZAF example) and interaction diagrams (for the description of the invention), and those skilled in the art will recognize that they are equivalent and; also will understand how to convert from one to the other without further explanation.

In FIG. 7, for example, the object called Zelda 706 obtains a list of current zoo keepers by calling an operation called List Zoo Keepers from the object called Zoo Keeper Register. The second processing step is represented in FIG. 7 by the Zoo Keeper Register object responding to the operation call by passing a message to the Zelda object that comprises the zoo keeper list. The zoo keeper objects include members of the Zoo Keepers class called Tina, Vince, and Fred. The third step indicated in the object diagram is for the object Zelda to pass a message to each of the zoo keepers instructing them to check the animals by calling the respective Check Animals operation of each zoo keeper object.

DETAILED DESCRIPTION

The present invention relates to a framework customization framework mechanism for customizing an input framework and for generating from the input framework a customized framework. Thus, described herein are three different and distinct frameworks: 1) the framework customization framework of the present invention; 2) the "input framework", which is the framework that needs to be extended using the framework customization framework; and 3) the "customized framework", which is the framework that results from extending the input framework using the framework customization framework of the present invention. For the sake of clarity, the input framework will always be referred to as the "input framework" herein, the customized framework will always be referred to as the "customized framework", and any other references to a framework refer to the framework customization framework.

Figure 8:
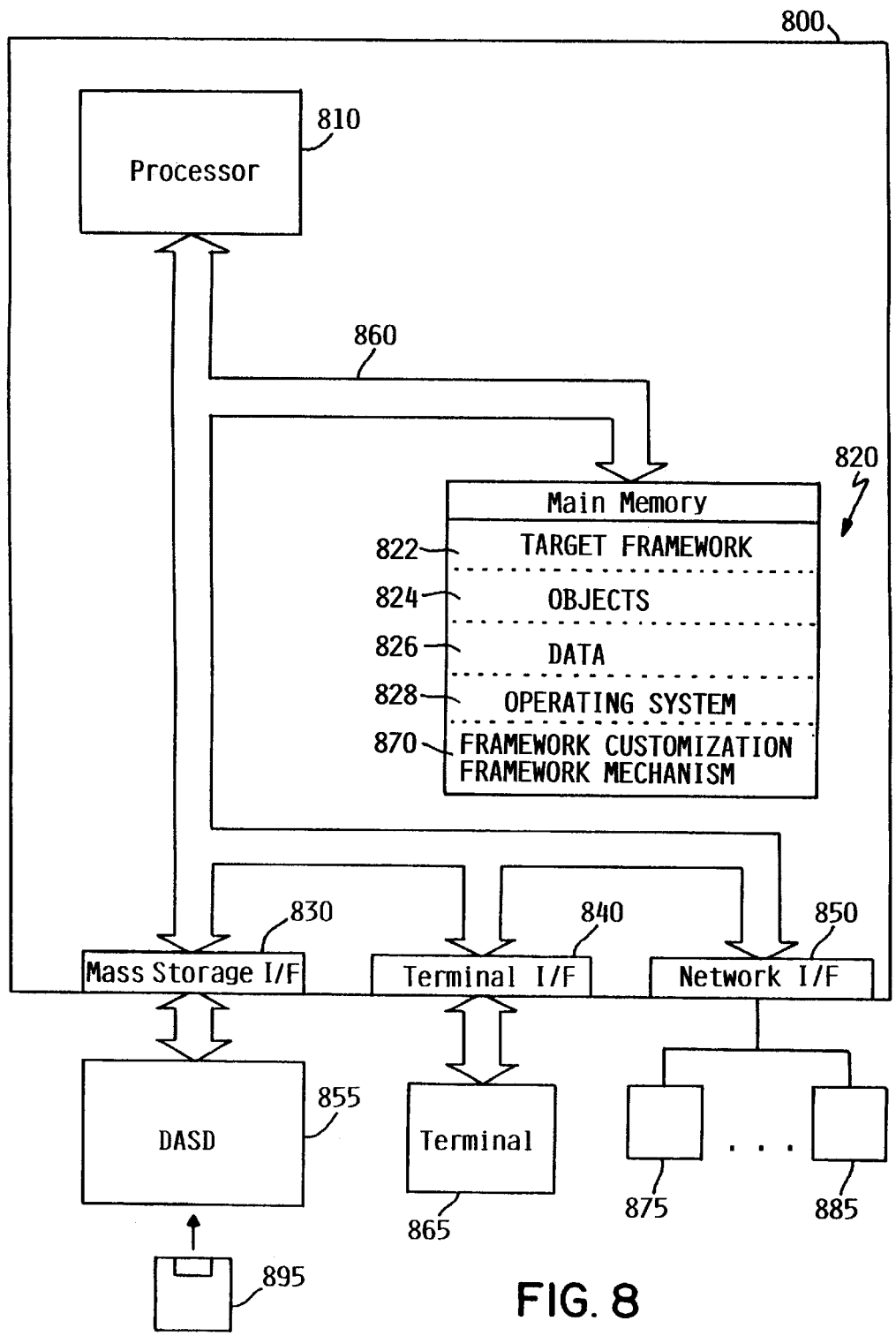
FIG. 8 is a block diagram of the computer system used in the preferred embodiment.

FIG. 8 shows a block diagram of a computer system 800 in accordance with the present invention. The computer system of the preferred embodiment is a computer system such as an AIX platform. However, those skilled in the art will appreciate that the mechanisms and apparatus of the present inventioniapply equally to any computer system, regardless of whether the computer system is a complicated multi-user computing apparatus or a single user workstation. As shown in the exploded view of FIG. 8, computer system 800 comprises one or more processors 810 connected to main memory 820, mass storage interface 830, terminal interface 840, and network interface 850. These system components are interconnected through the use of a system bus 860. Mass storage interface 830 is used to connect mass storage devices (such as DASD device 855) to computer system 800. One specific type of DASD device is a floppy disk drive, which may store data to and read data from a floppy diskette 895.

Main memory 820 contains an input framework 822, objects 824, data 826, an operating system 828, and a framework customization: framework 870. Computer system 800 utilizes well known virtual addressing mechanisms that allow the programs of computer system 800 to behave as if they only have access to a large, single storage entity (referred to herein as "memory") instead of access to multiple, smaller storage entities such as main memory 820 and DASD device 855. Therefore, while input framework 822, objects 824, operating system 828, and framework customization framework 870 are shown to reside in main memory 820, those skilled in the art will recognize that these programs are not necessarily all completely contained in main memory 820 at the same time. Note that the term "memory" is used herein to generically refer to the entire virtual memory of computer system 800.

Operating system 828 is a suitable multitasking operating system such as AIX; however, those skilled in the art will appreciate that the spirit and scope of the present invention is not limited to any one operating system, Operating system 828 preferably supports an object oriented programming environment such as that provided, for example, by the C++ programming language. In addition, an input framework 822 is provided. Input framework 822 is a framework that needs to be extended (i.e., customized) by a user in order to be used. Framework customization framework mechanism 870 is preferably an object oriented framework mechanism that is provided as a tool to help the user customize input framework 822. Framework mechanism 870 contains instructions capable of being executed on processor 810 and may exist anywhere in the virtual memory space of computer 800.

Although computer system 800 is shown to contain only a single main processor and a single system bus, those skilled in the art will appreciate that the present invention may be practiced using a computer system that has multiple processors and/or multiple buses, whether contained in a single unit or distributed across a distributed processing computer system. In addition, the interfaces that are used in the preferred embodiment each include separate, fully programmed microprocessors that are used to off-load compute-intensive processing from processor 810. However, those skilled in the art will appreciate that the present invention applies equally to computer systems that simply use I/O adapters to perform similar functions.

Terminal interface 840 is used to directly connect one or more terminals 865 to computer system 800. These terminals 865, which may be non-intelligent or fully programmable workstations, are used to allow system administrators and users to communicate with computer system 800.

Network interface 850 is used to connect other computer systems and/or workstations (e.g., 875 and 885 in FIG. 8) to computer system 800 in networked fashion. The present invention applies equally no matter how computer system 800 may be connected to other computer systems and/or workstations, regardless of whether the connection to the network is made using present-day analog and/or digital techniques or via some networking mechanism of the future. It is also important to point out that the presence of network interface 850 within computer, system 800 means that computer system 800 may engage in cooperative processing with one or more other computer systems or workstations. Of course, this in turn means that the programs shown in main memory 820 need not necessarily all reside on computer system 800. For example, one or more programs may reside on another system and engage in cooperative processing with one or more programs that reside on computer system 800. This cooperative processing could be accomplished through use of one of the well known client-server mechanisms such as remote procedure call (RPC).

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media such as floppy disks (e.g., 895 of FIG. 8) and CD ROMs and transmission type media such as digital and analog communication lirks.

Framework Customization Framework Mechanism of the Present Invention

The framework customization framework mechanism 870 disclosed herein provides an architecture for customizing any input framework using a common interface and set of tools. Extending the framework to accommodate the customization of a specific input framework defines a "framework customization environment." For example, extending the framework to allow custonization of a particular diagnostic framework used to test computer systems creates a framework customization environment that is tailored to extending the input diagnostic framework.

By providing framework mechanism 870 within computer system 800 to customize input framework 822, a uniform interface for all frameworks may be developed. Framework customization framework mechanism 870 may replace all of the disjoint proprietary applications that are currently used to perform customization of different object oriented frameworks. This allows a common user interface for customizing virtually any type of framework. This common user interface greatly eases the burden of customizing object oriented frameworks. Thus, one of the primary benefits of the framework disclosed herein is the capability to perform framework customization using a simple, easy to use user interface defined by the framework customization framework.

Figure 9:
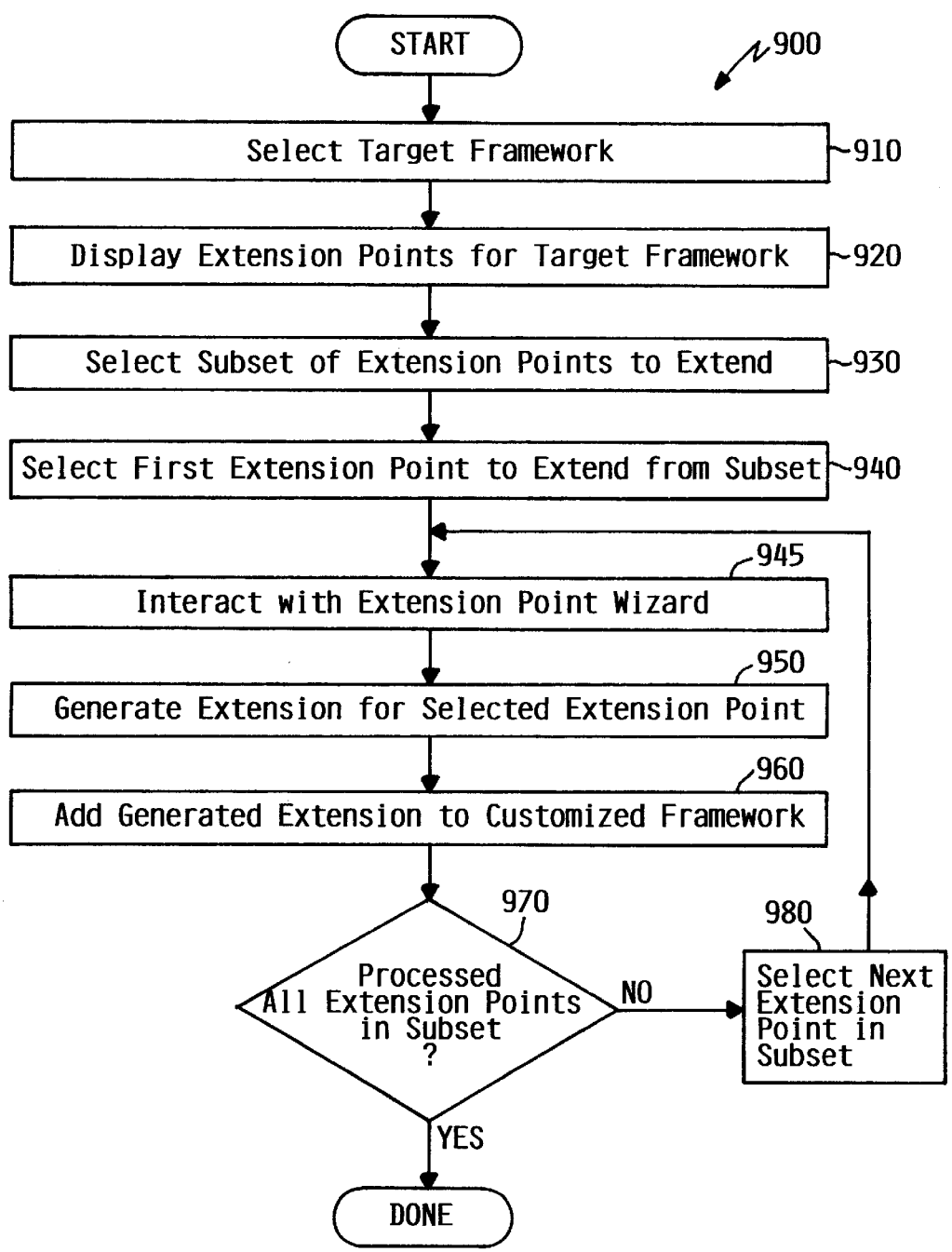
FIG. 9 is a flow diagram showing steps in accordance with the preferred embodiment to perform core functions of the framework customization framework mechanism.

Referring to FIG. 9, an example of framework customization framework 870 in accordance with the preferred embodiment performs steps that comprise a method 900 for customizing an input framework. The first step is to select an input framework (step 910). The framework mechanism of the invention may be used to customize a variety of different frameworks. Next, the extension points for the selected input framework are displayed to a user that wants to customize the input framework (step 920). The user selects from the extension points a subset of extension points to extend (step 930). A subset in this context means any number of extension points from one up to and including the maximum number of extension points available in the input framework. Next, one of the extension points in the subset is selected (step 940). The user then interacts with the extension point wizard to complete the extension (step 945). The appropriate extension to the input framework corresponding to the selected extension point is then generated according to the user's input (step 950) and added to the customized framework (step 960). The customized framework is initially a copy of the input framework, but as each extension point in the subset becomes an extension, it is added to the customized framework. Next, method 900 determines if all the extension points in the subset have been processed (step 970). If so (step 970=YES), method 900 is done. If not (step 970=NO), another extension point in the subset is selected (step 980) and processed (steps 945, 950 and 960) until all extension points in the subset have been processed (step 970=YES).

Note that method 900 depicts the core function of framework mechanism 870. The detailed function of a particular application made from the customized framework depends on the details of the implementation, as will be explained with reference to the specific examples below.

The fact that the preferred embodiment of the framework is object oriented allows the consumer of the framework to easily define the needed functions by subclassing from the classes defined within the framework using known object oriented programming environments, such as C++. The preferred embodiment of the present invention is an object oriented framework customization framework. While many different designs and implementations are possible, one suitable example of an object oriented framework customization framework is disclosed below to illustrate the broad concepts of the present invention.

Class Definitions

Figure 10:
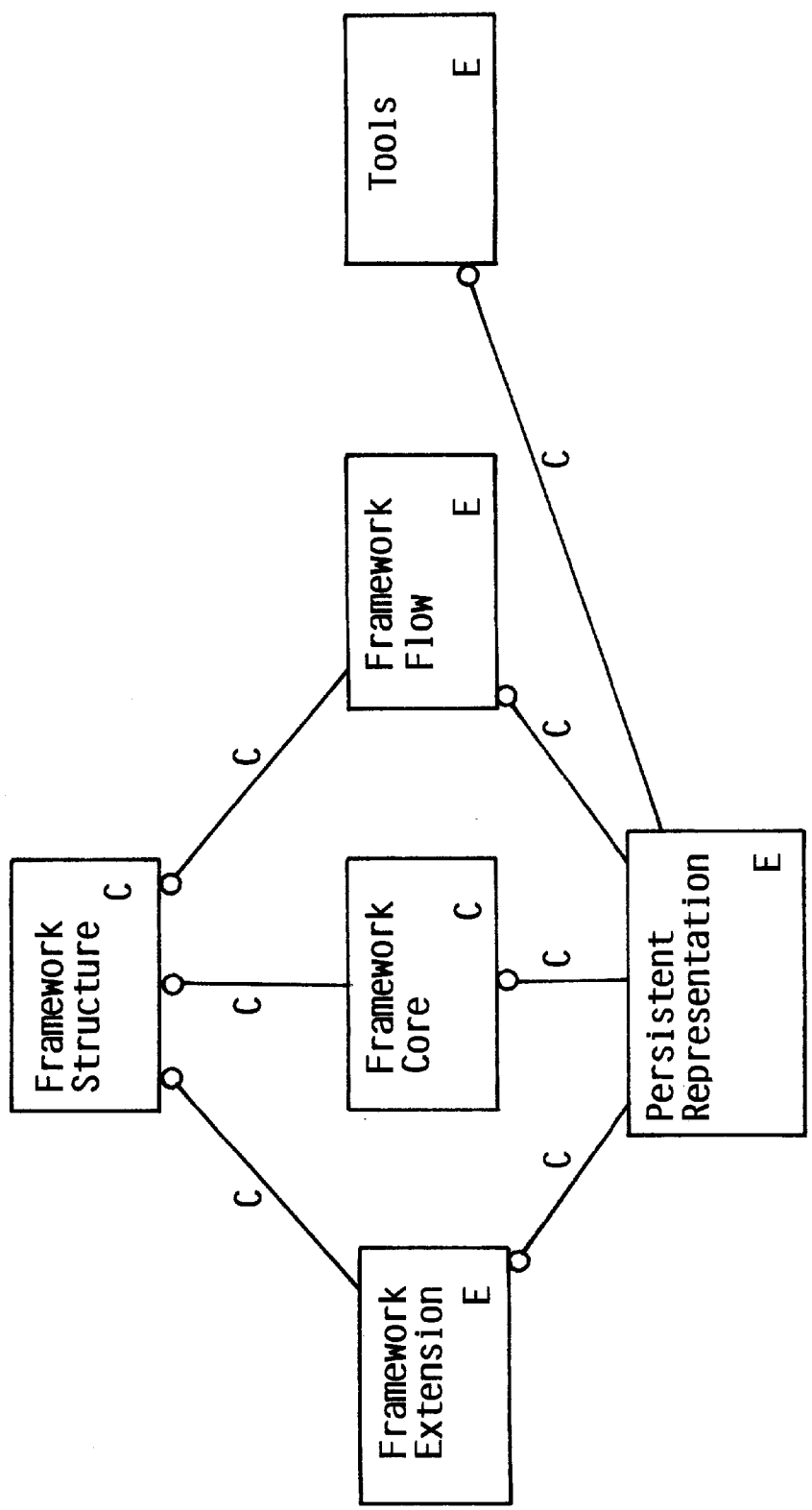
FIG. 10 is a category diagram of the framework customization framework mechanism constructed in accordance with the teachings of the preferred embodiment.

FIG. 10 is a category diagram of the diagnostic framework mechanism 870 in accordance with the present invention. Those skilled in the art will appreciate that the categories illustrated in FIG. 10 represent collections of object oriented programming (OOP) objects that encapsulate data attributes and behaviors (or methods) and are stored in the main memory 820 of computer system 800. These objects may be implemented, for example, in a computer system operating environment that supports the C++ programming language.

The categories of classes have been brokenidown into six groups: Framework Structure (FWS), Framework Extension (FWE), Framework Core (FWC), Framework Flow (FWF), Persistent Representation (PR) and Tools. The Framework Structure and Framework Core categories are both core (as indicated by the "C" label. The remaining categories (i.e., FWE, FWF, PR, and Tools) are extensible (as indicated by the "E" label), meaning that they may be modified by a user of framework mechanism 870. Framework Structure has a using relationship with the Framework Extension, Framework Core, and Framework Flow categories, indicating that objects in the Framework Structure category invoke the methods provided by the classes in the FWE, FWC, and FWF categories. Each of the Framework Extension, Framework Core, Framework Flow, and Tools have a using relationship with Persistent Representation. Note that these relationships between categories are all core relationships (as indicated by the "C" label), meaning that the framework user cannot modify these relationships.

Figure 11A:
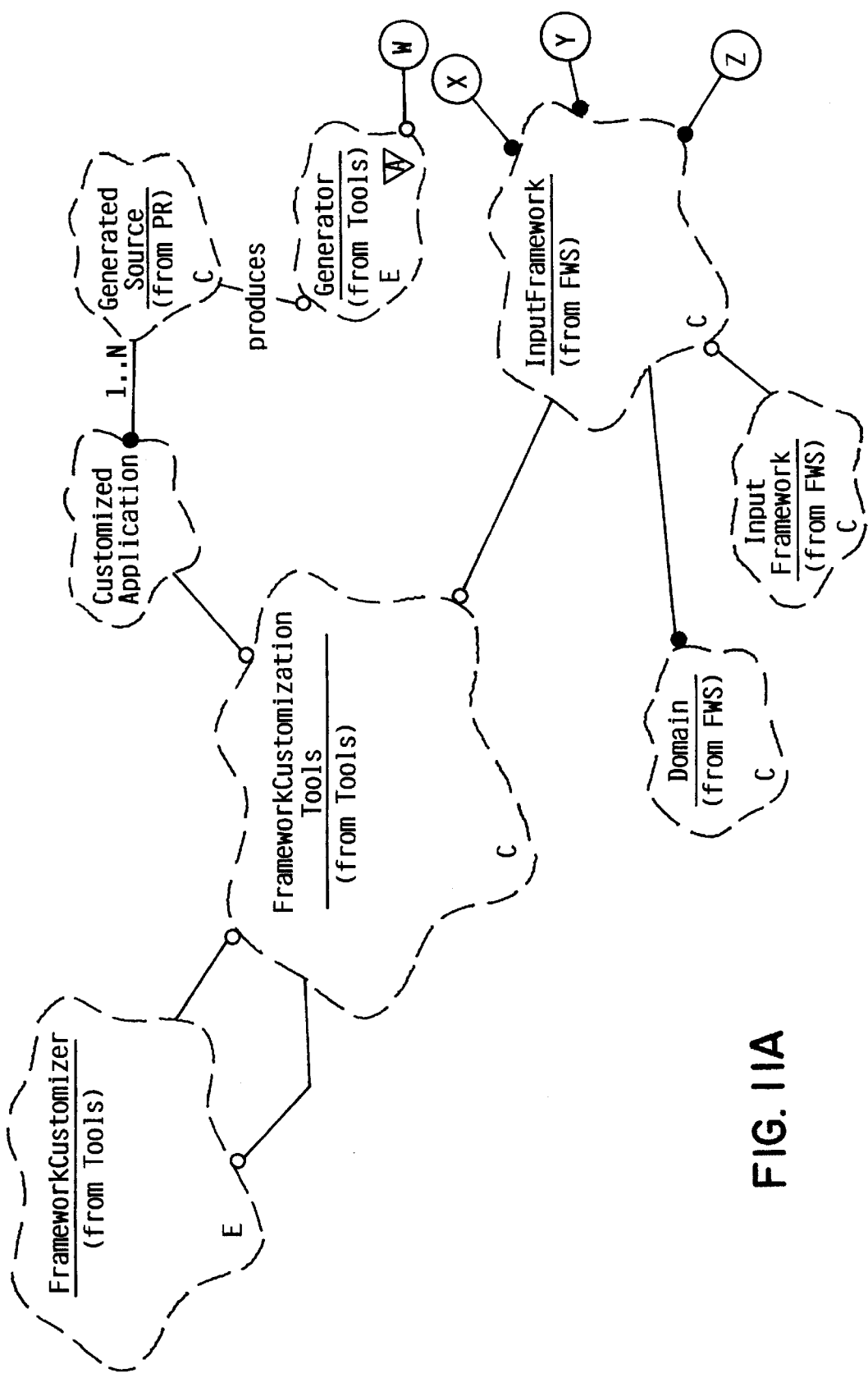
FIGS. 11–17 are class diagrams of the framework mechanism constructed in accordance with the teachings of the preferred embodiment.
Figure 11B:
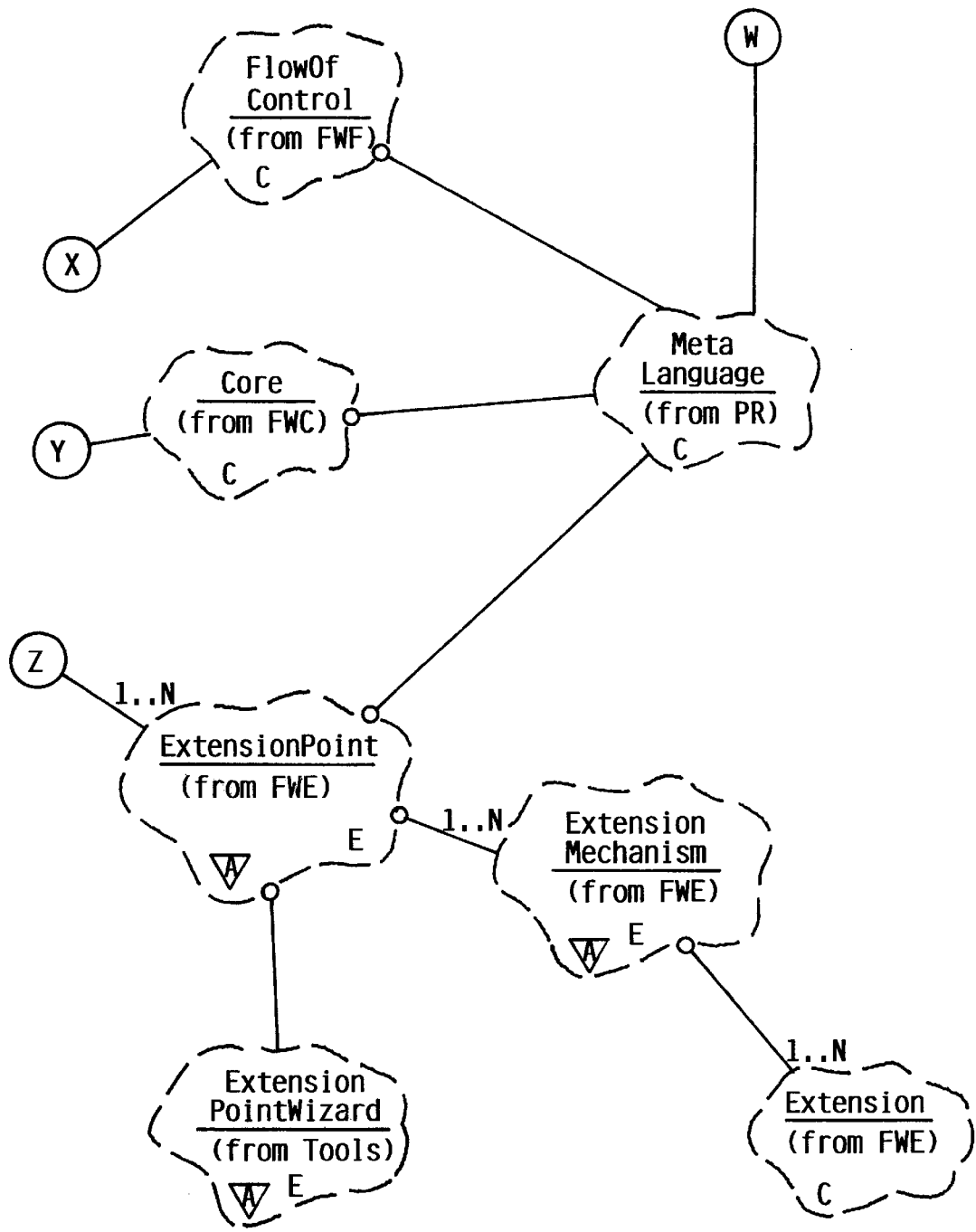

FIG. 11 is a top level class diagram of many of the classes used to implement framework customization framework 870, which include: FrameworkCustomizer; FrameworkCustomizationTools; InputFramework; Domain; Framework; Customized Application; GeneratedSource; Generator; MetaLanguage; FlowOfControl; Core; ExtensionPoint; ExtensionPointWizard; ExtensionMechanism; and Extension. Not all the classes that comprise the framework 870 of the present invention are shown in FIG. 11. Other classes are shown in FIGS. 12–17 that are, also part of framework 870. Those skilled in the art will appreciate that the classes illustrated in FIG. 11 encapsulate data attributes and behaviors (or methods), and that objects 824 instantiated as members of these classes are stored in the main memory 820 of computer system 800. These classes may be implemented, for example, in a computer system operating environment that supports the C++ programming language.

The FrameworkCustomizer class represents one or more users that may wish to customize an input framework. A user in this context will likely be a human programmer, but may also include other automated mechanisms (such as computer programs). The FrameworkCustomizer class is an extensible class of the framework mechanism, as denoted by the "E" label within the class.

The FrameworkCustomizer class has a using relationship with the ExtensionPointWizard class and with the FrameworkCustomizationTools class, which also has a using relationship with the FrameworkCustomizer class. The FrameworkCustomizationTools class contains all the tools necessary to allow a FrameworkCustomizer to customize an input framework, and is an extensible class. FrameworkCustomizationTools has a using relationship with the CustomizedApplication class, indicating that the FrameworkCustomizationTools may produce one or more customized applications. The FrameworkCustomizationTools also has a using relationship with the InputFramework class, which allows an object instantiated as a member of the FrameworkCustomizationTools class to pass information about an input framework to an object that is a member of the FrameworkCustomizer class.

InputFramework is a core class that defines one or more frameworks that need to be customized. Each InputFramework belongs to a domain. Examples of suitable domains include: finance, order processing, manufacturing, sales, etc. The class Domain is a core class, and has a "has" relationship with the IputFramework class, indicating that each Domain has one or more InputFrameworks. In addition, the InputFramework class has a using relationship with a Framework core class, indicating that an input framework may use another input framework. The InputFramework class has a "has" relationship with the FlowOfControl class, Core class, and ExtensionPoint class, indicating that each object instantiated under the InputFramework class will have an object that is a member of the FlowOfControl class, an object that is a member of the Core class, and one or more objects that are members of the ExtensionPoint class. FlowOfControl and ExtensionPoint are both extensible, while Core is a core class. Each of these three classes have a using relationship with the MetaLanguage class, which is extensible. When an input framework is captured in persistent storage, it is represented by a special language known as a metalanguage that describes the flow of control, the core functions of the input framework, and the extension points of the input framework. A Generator class reads the metalanguage for a particular input framework, and generates therefrom an object that is a member of the GeneratedSource extensible class. The CustomizedApplication class has a "has" relationship with the GeneratedSource class, indicating that a customized application has corresponding generated source code.

The ExtensionPoint class has a using relationship with each of the ExtensionPointWizard and ExtensionMechanism extensible classes. The ExtensionMechanism class has a using relationship with the Extension extensible class. This means that there may be one or many extension mechanisms that correspond to each extension point, and one or more extensions that correspond to each extension mechanism. The ExtensionPointWizard is an extensible class that defines a tool that guides a user through the process of customizing an input framework.

Figure 12A:
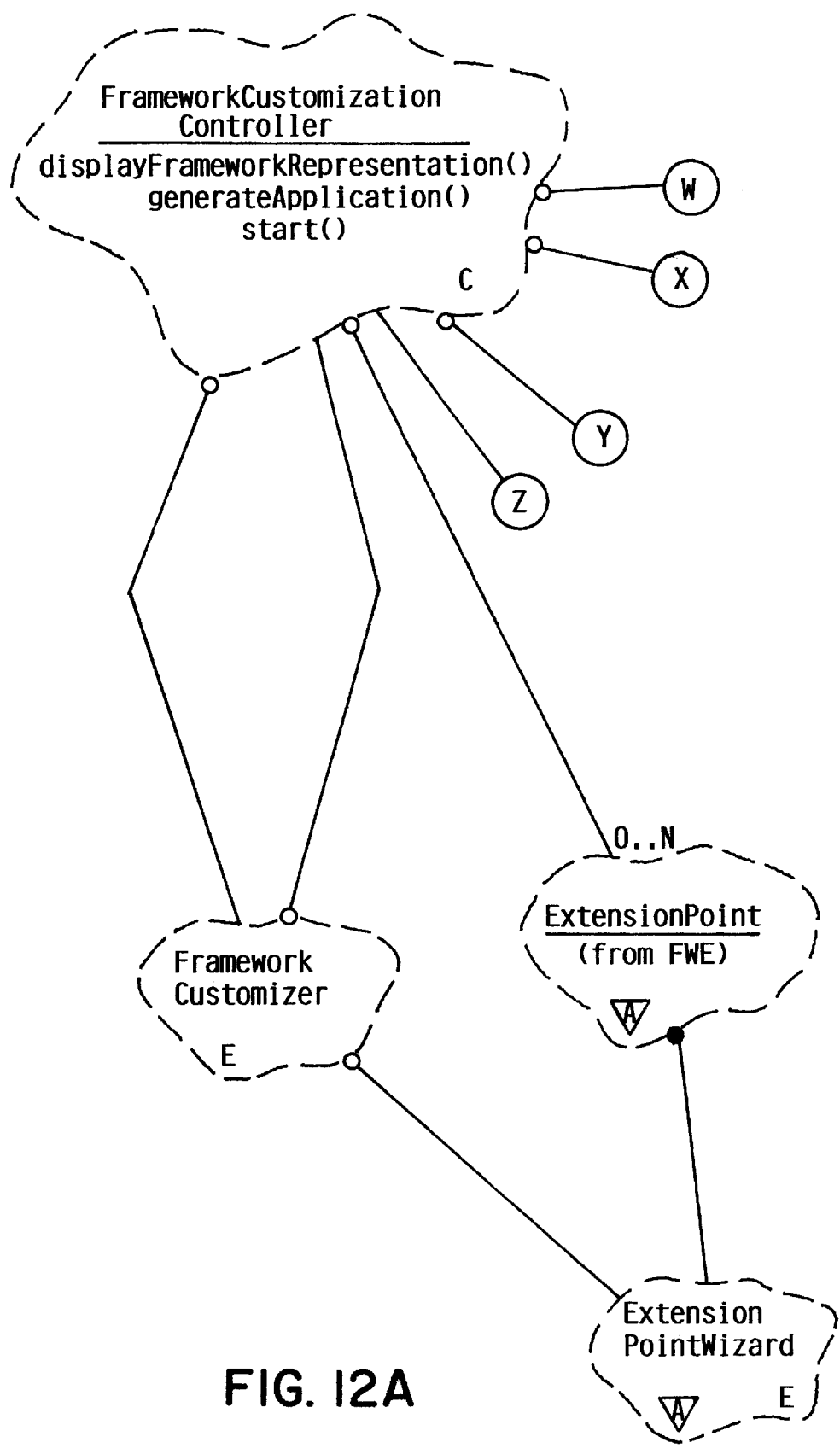
Figure 12B:
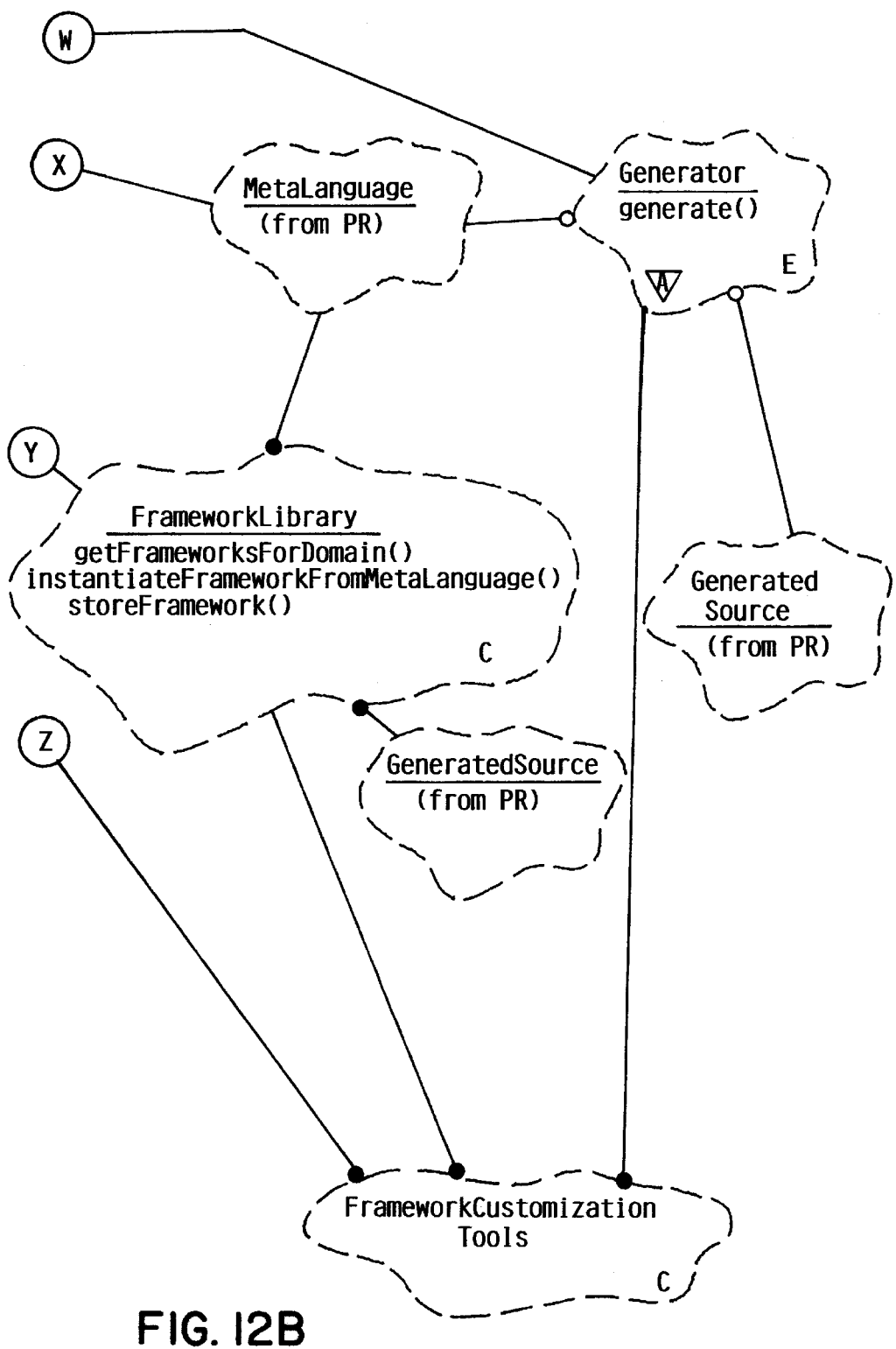

Referring now to FIG. 12, classes that belong to the Tools category in FIG. 10 include: FrameworkCustomizationController; FrameworkCustomizer; ExtensionPointWizard; FrameworkLibrary; FrameworkCustomizationTools; and Generator. Also shown in FIG. 12 are the ExtensionPoint, MetaLanguage, and GeneratedSource classes from other categories for the purpose of best illustrating the classes in the Tools category. The class relationships are as follows: the FrameworkCustomizationController has a using relationship with the FrameworkCustomizer class, the ExtensionPoint class, the FrameworkLibrary class, the MetaLanguage class, and the Generator class; the FrameworkCustomizer class has a using relationship with the FrameworkCustomizationController class and the ExtensionPointWizard class; the ExtensionPoint class has a "has" relationship with the ExtensionPointWizard class; the FrameworkCustomizationTools class has a "has" relationship with the FrameworkCustomizationController class, the FrameworkLibrary class, and the Generator class; the FrameworkLibrary class has a "has" relationship with the GeneratedSource class and the MetaLanguage class; and the Generator class has a using relationship with the MetaLanguage class and the GeneratedSource class.

A user invokes the framework 870 by invoking the starto method on an object instantiated under the FrameworkCustomizationController class. The method displayFrameworkRepresentation( ) causes a representation of the input framework to be presented to the user. In the case of a human user, the representation of the framework is graphical. The generateApplication( )method is used to cause the Generator to generate a customized application from the customized framework by invoking its generates method.

The FrameworkLibrary class is a framework library, which is a place for storing multiple frameworks. The getFrameworksForDomain( ) method determines which frameworks apply to a selected domain. The instantiateFrameworkFromMetaLanguage( ) is a method used to instantiate the input framework. The storeFramework( ) method is used to store a framework (such as a newly created customized framework) into the framework library.

Figure 13:
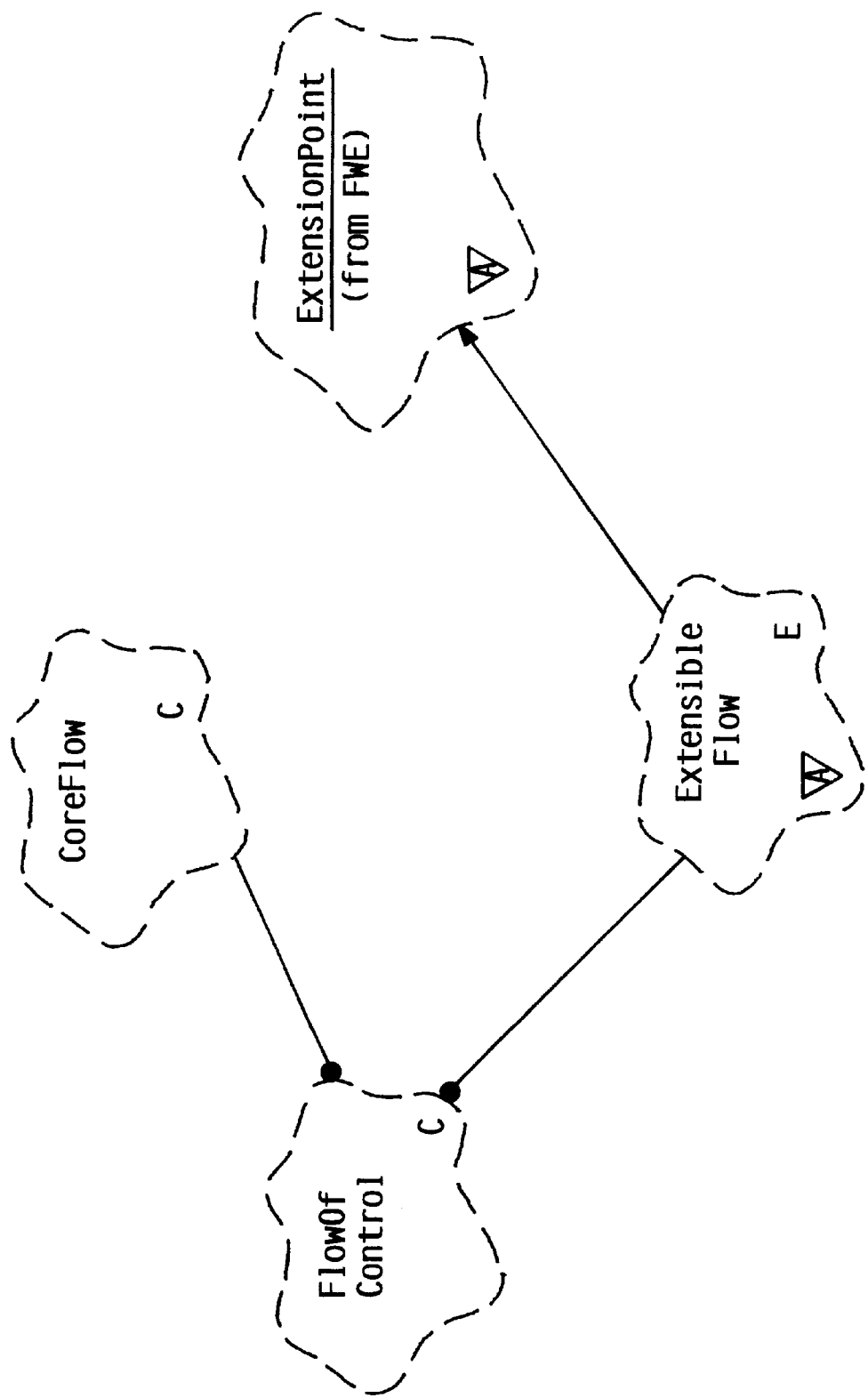

Referring to FIG. 13, the classes in the Framework Flow category include: FlowOfControl; CoreFlow; and ExtensibleFlow. The ExtensionPoint class that is a member of the Framework Extension category is also shown. The underlying idea is that any input framework has a flow of control that may be made up of core and extensible portions. Any portion of the flow of control that may be modified by the user is an extensible flow, while any portion that may not be modified by the user is a core flow. Generally, a user may view both core and extensible flows to aid the user in understanding the function of the framework. FlowOfControl is a core class that has a "has" relationship with CoreFlow and ExtensibleFlow. ExtensibleFlow is an abstract extensible class, which means that this class must be extended to define the extensible flow portions of the input framework. In addition, ExtensibleFlow is a subclass of the ExtensionPoint abstract class, indicating that the extensible flows are extension points that may be customized by the user. CoreFlow is a core class that represents portions of the flow of control in the input framework that may not be viewed or accessed by a user of the framework customization framework.

Figure 14A:
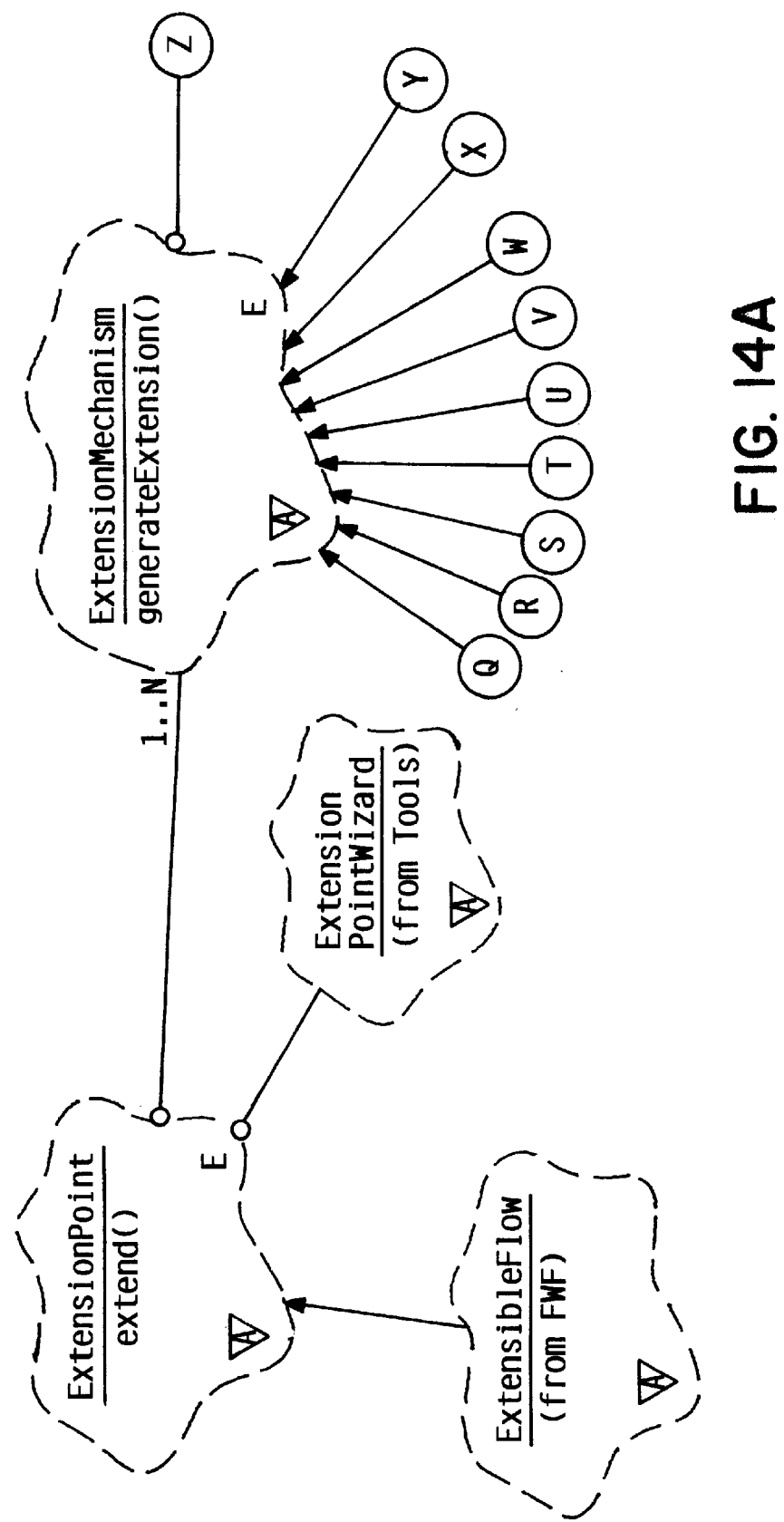
Figure 14B:
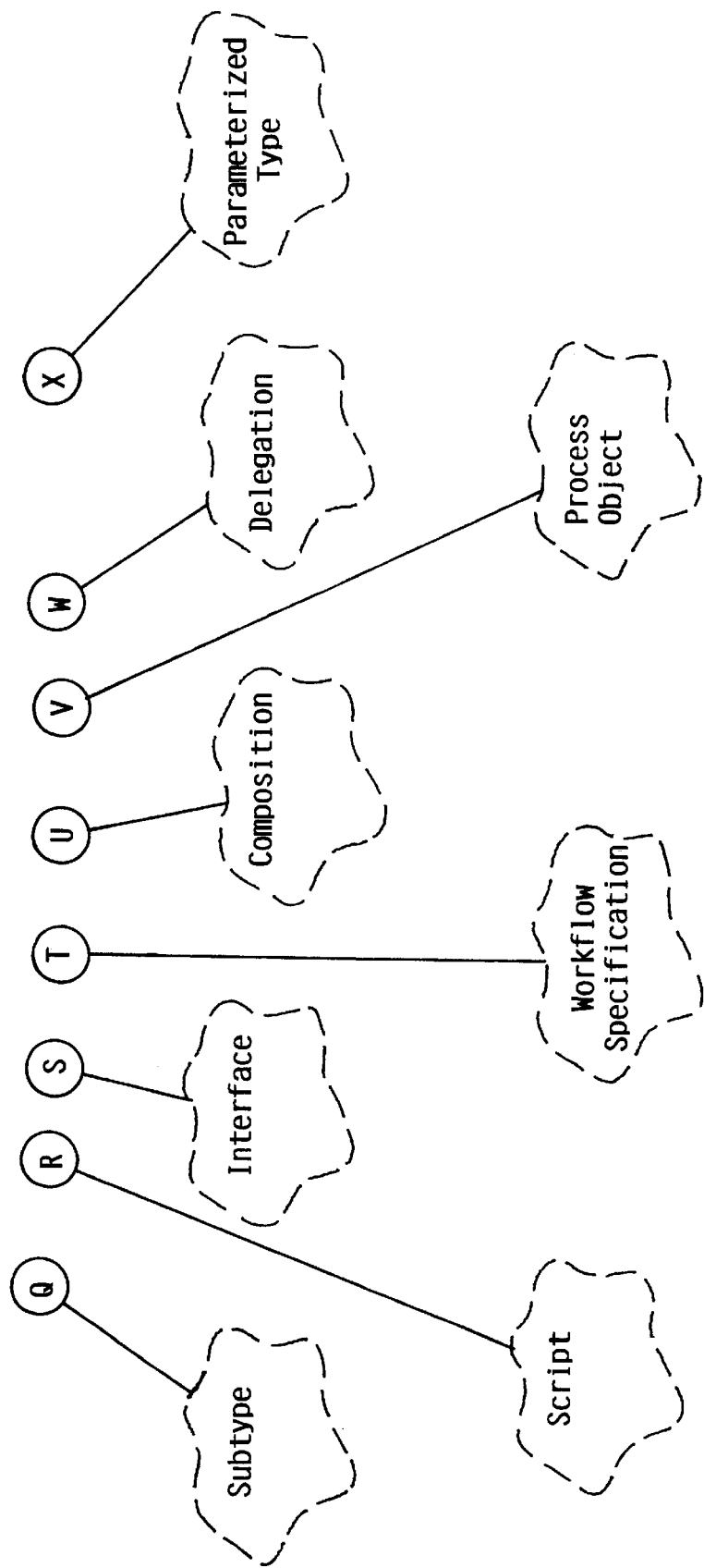
Figure 14C:
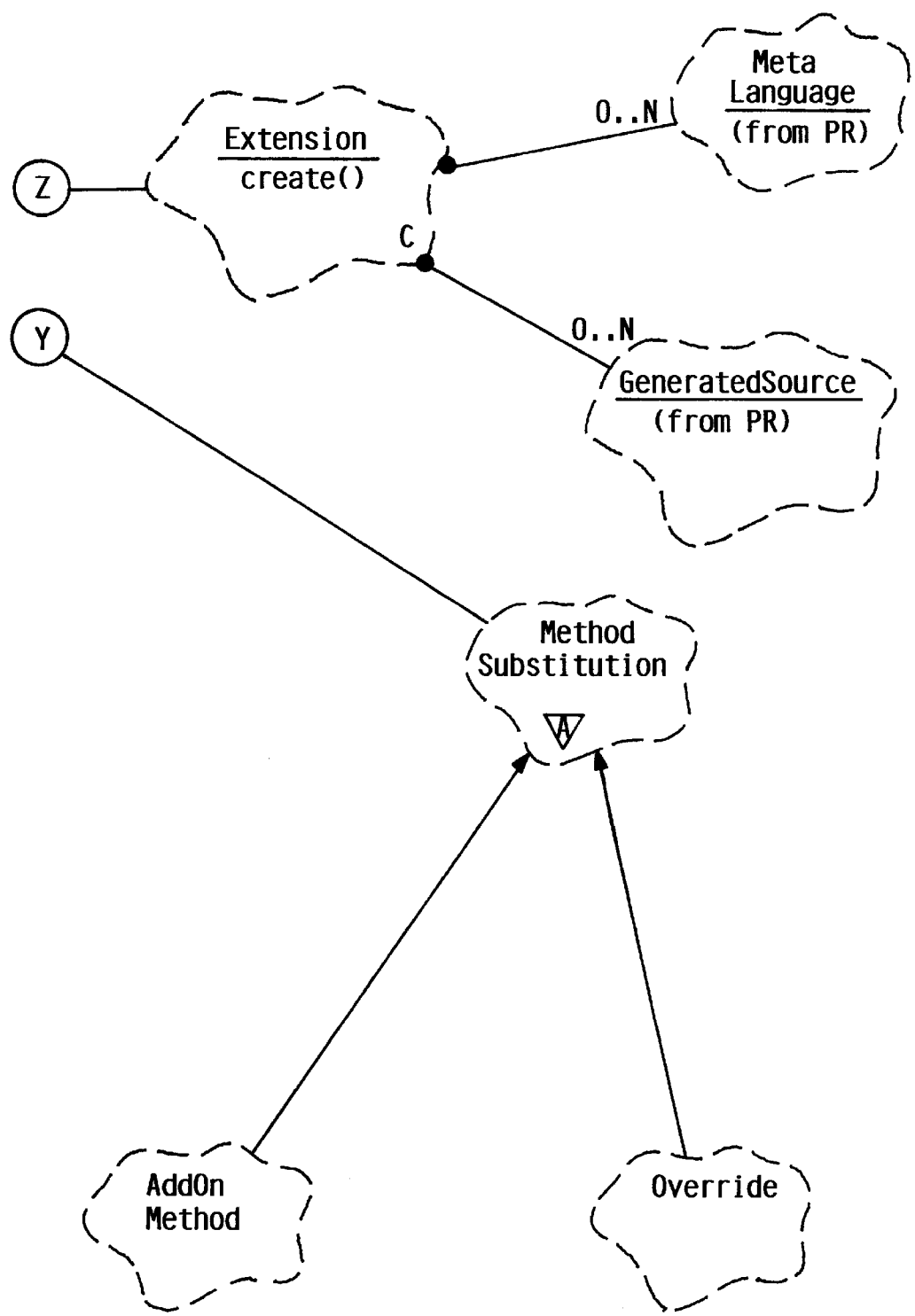

Referring to FIG. 14, the classes that belong to the Framework Extension category include: ExtensionPoint, ExtensionMechanism, and Extension. ExtensionPoint and ExtensionMechanism are extensible classes, while Extension is a core class. Also shown for the purpose of illustrating the concepts of the invention are the classes of ExtensibleFlow, ExtensionPointWizard, MetaLanguage, GeneratedSource, and various subtypes of ExtensionMechanism. The ExtensionPoint class is an abstract class that includes a method extends that is used to extend the input framework at a desired extension point. ExtensibleFlow is a subtype of the ExtensionPoint class because an extensible flow is defined to be a flow that a user may extend, and is thus an extension point for the framework customization framework. The ExtensionPoint class has a using relationship with ExtensionMechanism and ExtensionPointWizard, and there may be one or more extension mechanisms that correspond to each extension point. The ExtensionMechanism class includes a method generateExtension( ) that is used to generate the extension for the particular extension point. The creates method on the Extension class is used by the generateExtensiono method to create one or more extensions to the input framework that correspond to a particular extension point. The Extension class has a "has" relationship with the MetaLanguage class and the GeneratedSource class, with each extension including from zero to N objects from each of these classes.

The various subtypes of ExtensionMechanism in FIG. 14 are examples of suitable extension mechanisms, and is not intended to represent an exhaustive list. The important concept illustrated by the many subtypes is that ExtensionMechanism may be subclassed to provide any suitable extension mechanism, whether now known or developed in the future. Examples of extension mechanisms for extensible flows include the Script class, the WorkflowSpecification class, and the ProcessObject class. Each of these represent different ways that the flow in an input framework may be extended by the user to capture the flow of the input framework. The classes encapsulate a particular type of flow specification and allow it to behave within the framework like any other extension mechanism. In addition, examples of non-flow extension mechanisms include the classes of: Subtype, Interface, Composition, Delegation, ParameterizedType, and MethodSubstitution. These are all presently-known mechanisms for extending object-oriented programs, and are generally understood by those skilled in the art. The Subtype class defines a mechanism for defining new classes through subclassing. The Interface class is a mechanism that allows a user to specify a defined interface or a subset of methods from the defined interface for a class so that the interface need not be re-written for each new class. The Composition class defines a mechanism that allows two classes to be related with a "has" relationship, allowing a composition of classes to be contained within a single class. The Delegation class defines a mechanism that allows one class to delegate the performance of certain tasks to other classes. The ParameterizedType class defines a generic class that takes another class type as a parameter. The MethodSubstitution class defines a way to change particular methods defined in a class. Two examples of method substitution are shown by the two subclasses of MethodSubstitution: AddOnMethod and Override. AddOnMethod allows a method to be added to the interface for a class, while Override allows a user to re-define a method to accomplish a new fumction.

Figure 15A:
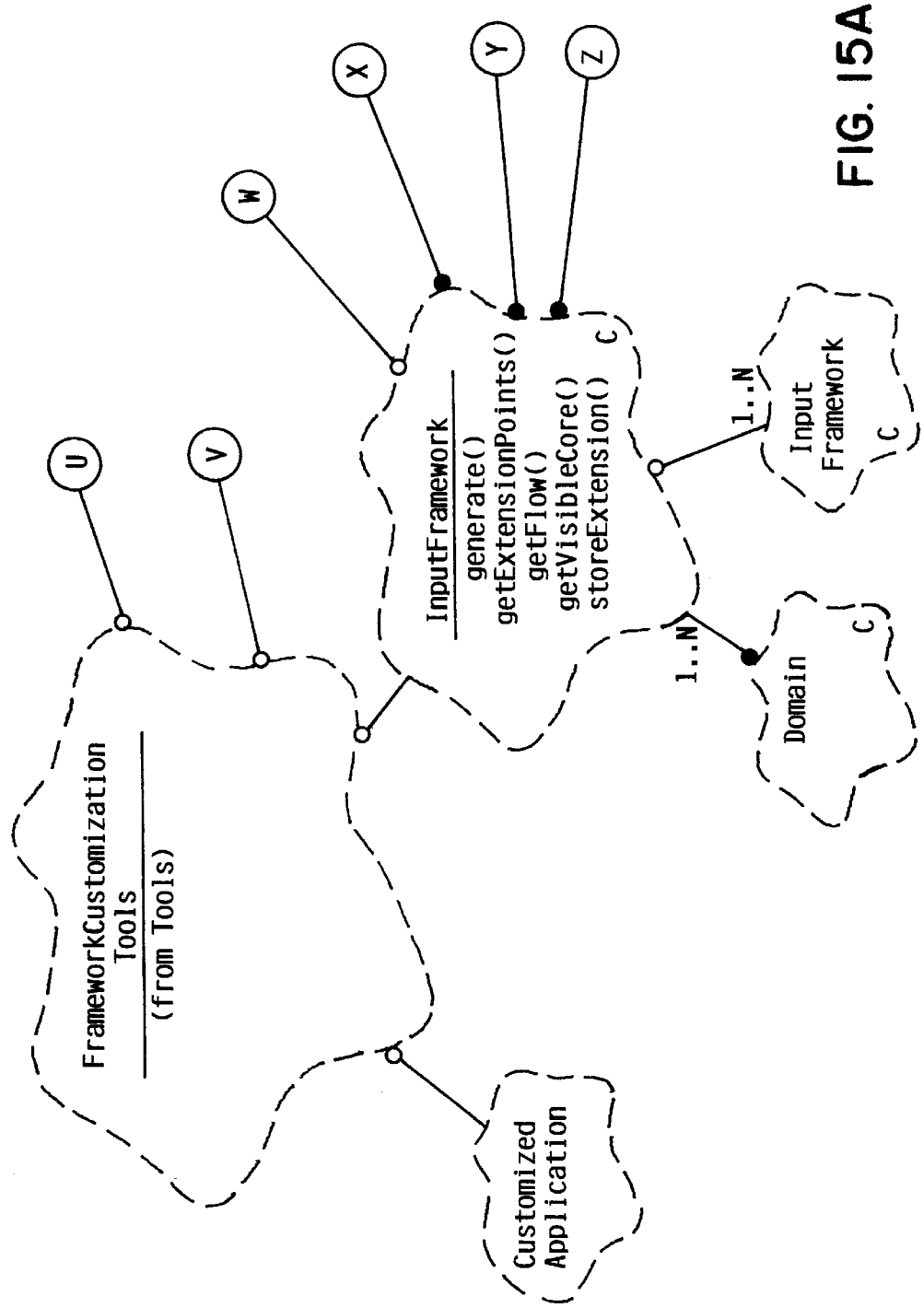
Figure 15B:
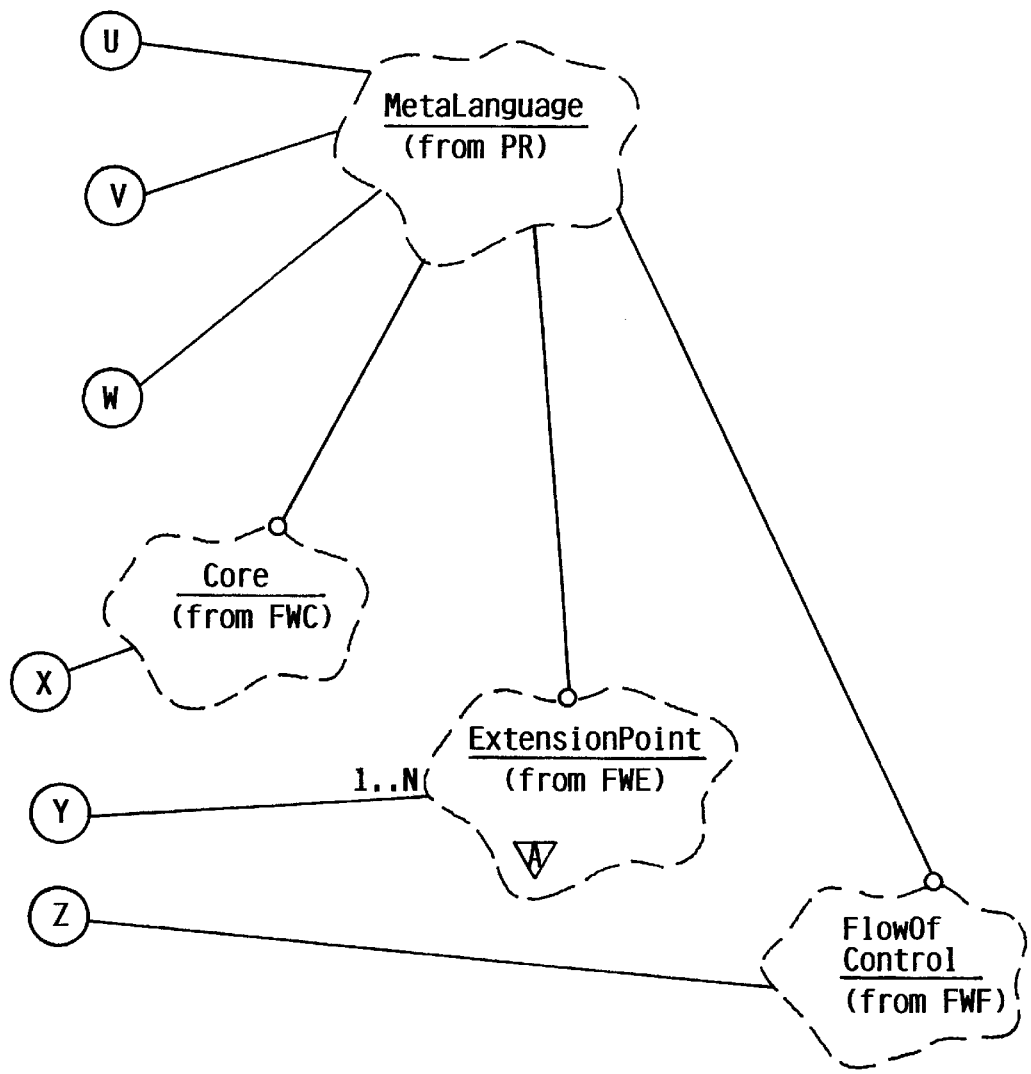

Referring to FIG. 15, the classes in the Framework Structure category include the core classes InputFramework and Domain. Also shown in FIG. 15 are other classes to illustrate the interaction between the classes in the Framework Structure class and these other classes, namely: FrameworkCustomizationTools, CustomizedApplication, Framework, MetaLanguage, Core, ExtensionPoint, and FlowOfControl. FrameworkCustomizationTools has a using relationship with the CustomizedApplication class, the InputFramework class, and the MetaLanguage class. These class relationships represent that the FrameworkCustomizationTOols interprets and customizes a metalanguage representation of an input framework, and produces a customized application. The InputFramework class has a using relationship with the Framework class and the MetaLanguage class, indicating that an input framework may use one or more frameworks, and may be described in metalanguage. InputFramework has a "has" relationship with the Core class, the ExtensionPoint class, and the FlowOfControl class, indicating that each input framework will contain a core portion, a flow of control, and one or more extension points. The Core class, ExtensionPoint class, and FlowOfControl class each have a using relationship with the MetaLanguage class, indicating that these three classes may be described in the metalanguage representation of the input or customized framework.

The InputFramework class defines the methods generate( ), getExtensionPoints( ), getFlow( ), getVisibleCore( ), and storeExtensions( ). The generates method is invoked to tell the input framework, after it has been customized, to generate a customized application that is a member of the CustomizedApplication class. The getExtensionPoints( ) method is used to determine the extension points in the input framework. The getFlow( ) method is invoked to allow the user to determine the extensible and core flow portions of the input framework. The getVisibleCore( ) method allows a user to view portions of the core of the input framework that the user cannot modify. This method is provided to allow a: user to view the internal workings of the framework in an effort to help the user understand the input framework. The storeExtension( ) method is provided to store an extension into a customized framework that has been generated from an input framework.

Figure 16A:
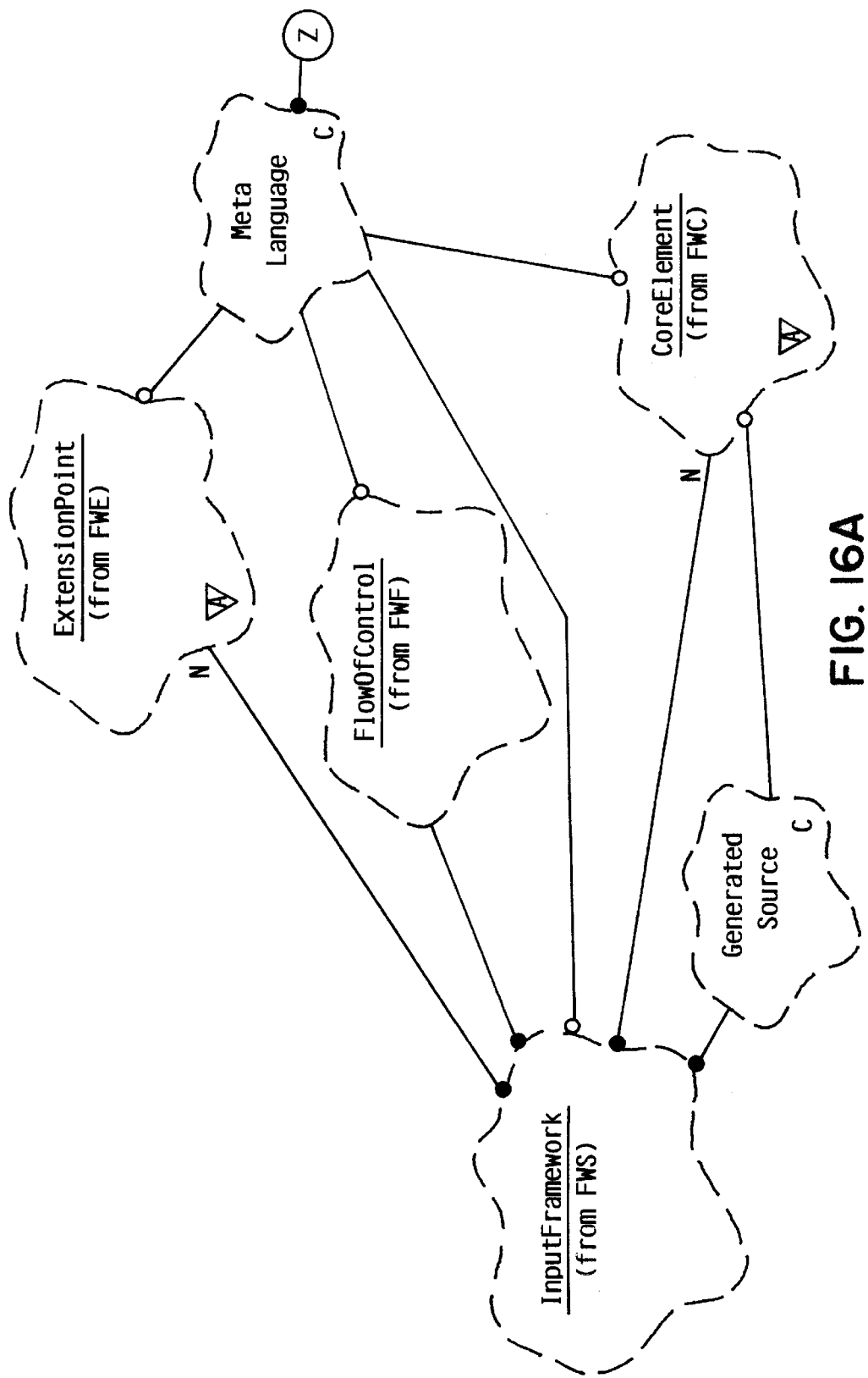
Figure 16B:
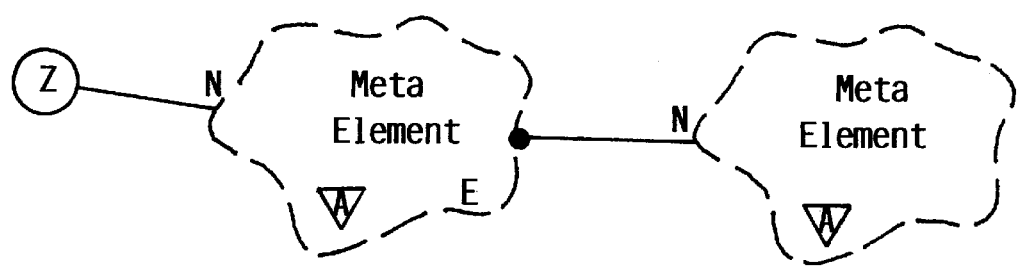

Referring to FIG. 16, the classes that are members of the PersistentRepresentation category include the core classes of GeneratedSource and MetaLanguage, and the extensible class MetaElement. Also shown in FIG. 16 are the classes InputFramework, ExtensionPoint, FlowOfControl, and CoreElement, which each have a using relationship with the MetaLanguage class, indicating that the metalanguage representation of the input framework represents the extension points, flow of control, and core elements of the input framework. The class InputFramework has a "has" relationship with the ExtensionPoint class, the FlowOfControl class, the CoreElement class, and the GeneratedSource class, indicating that each InputFramework mechanism has corresponding generated source code and flow of control, and one or more extension points and core elements. The CoreElement class has a using relationship with the MetaLanguage class and the GeneratedSource class, indicating that a core element may be described in either or both of these classes. The MetaLanguage class has a "has" relationship with the MetaElement class, which also has a "has" relationship with itself, indicating that a metalanguage representation of an input framework comprises a collection of one or more meta elements, which may each comprise one or more nested meta elements. Note that MetaElement is an abstract class that must be appropriately extended by a user.

Figure 17:
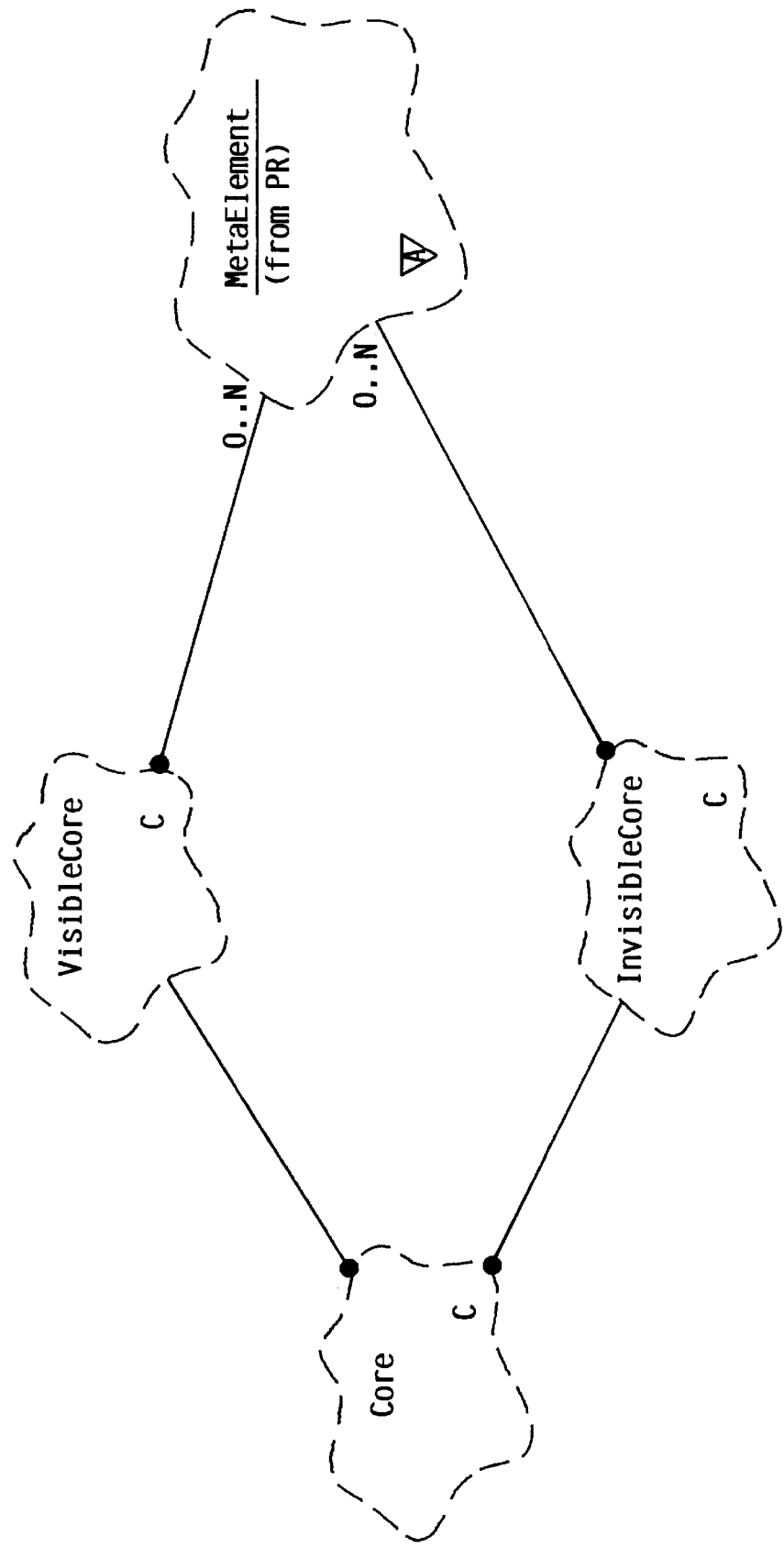

Referring to FIG. 17, the classes that are members of the Framework Core category include the core classes of Core, VisibleCore, and InvisibleCore. The Core class has a "has" relationship with the VisibleCore and InvisibleCore classes, indicating that each core may be comprised of a visible and invisible portion. Both VisibleCore and InvisibleCore have a "has" relationship with the MetaElement class, indicating that both the visible and invisible portions of the core may have from zero to N metaelements.

Core Functions

FIGS. 11–17 distinguish between core and extensible classes in the framework customization framework of the present invention by the respective labels C and E. All class relationships shown in FIGS. 11–17 are core relationships, and may not be modified by the user of the framework. In fact, it is the fixed character of these relationships between classes that characterizes a framework and makes it useful and powerful. The core function of the framework customization framework is defined by the core classes, the core class relationships, and the functional requirements that cause the framework to behave in the desired manner. As described. above with respect to FIG. 9, the overall core function of the framework customization framework includes the steps of method 900. Note, however, that not all of the steps of method 900 need be implemented in a particular framework customization environment. The various functions of FIG. 9 are core functions not because they are always performed, but because the framework provides support for the implementation of each of these steps. The specific steps that make up any framework customization environment depend on how the consumer of the framework extends the classes and defines (or overrides) the appropriate methods.

Object Interaction

Figure 18A:
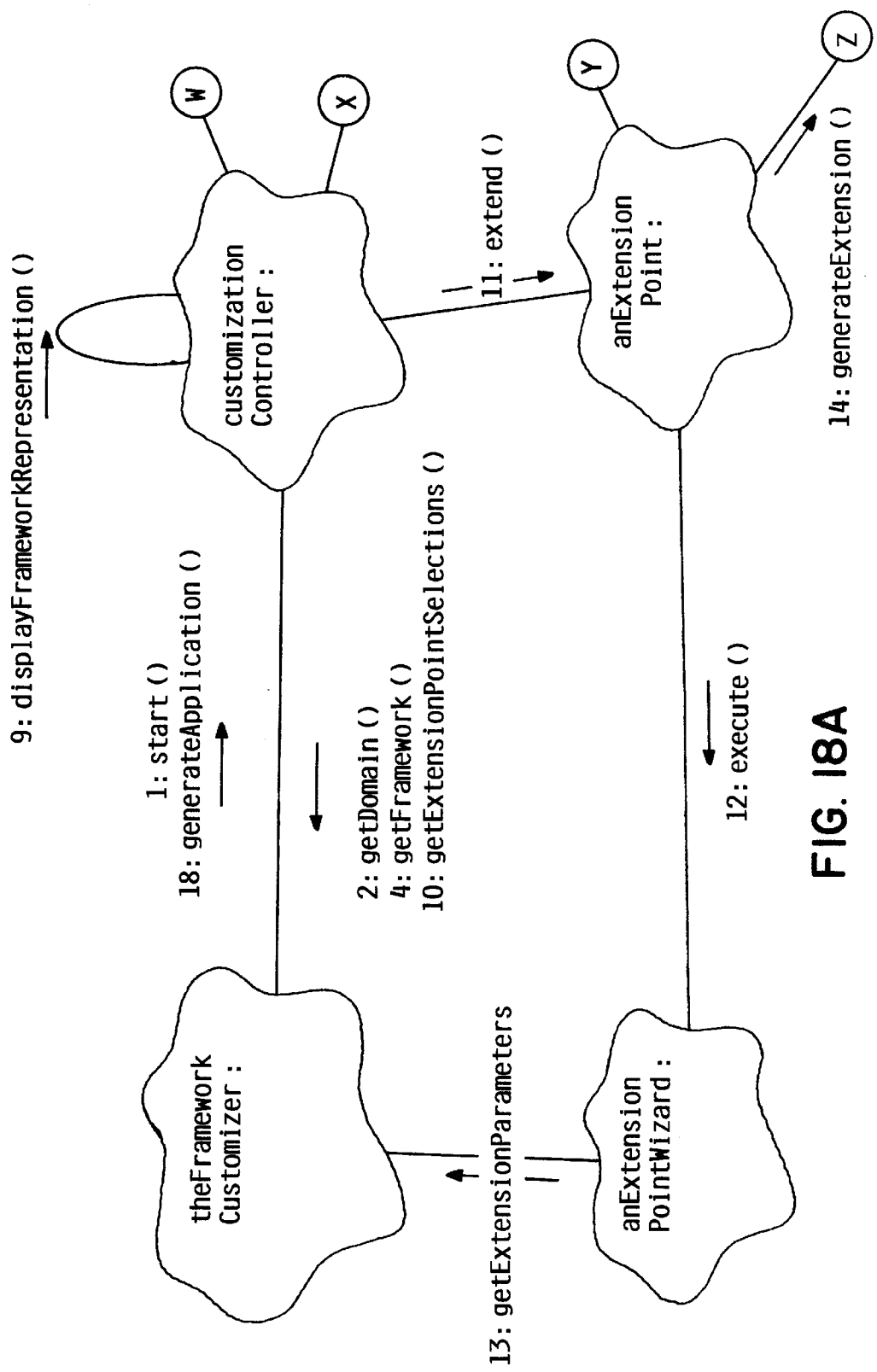
FIG. 18 is an object diagram of one particular framework mechanism constructed in accordance with the class diagram of FIGS. 11–17.
Figure 18B:
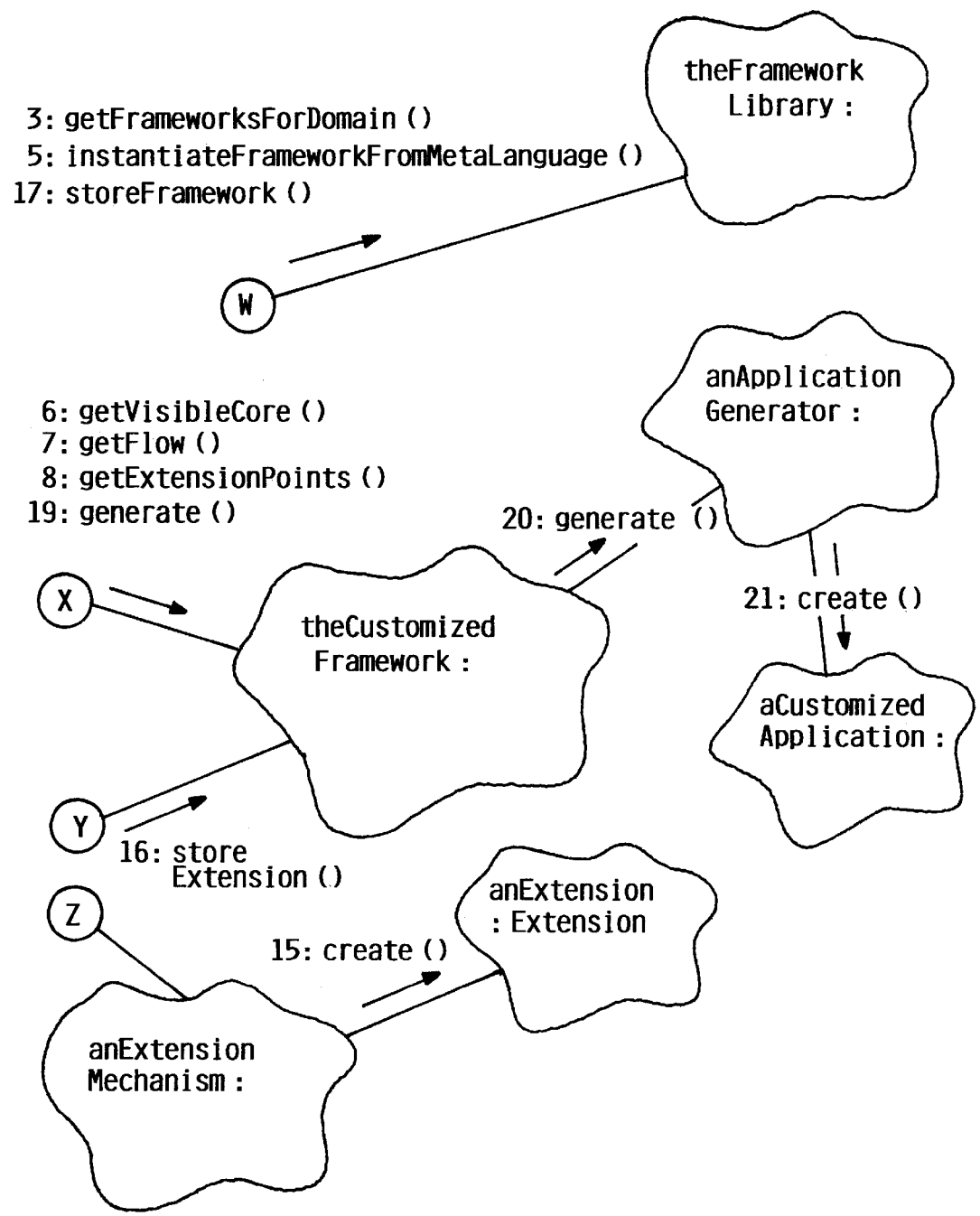

The detailed operation of framework 870 in accordance with the preferred embodiments will now be illustrated with reference to the object diagram of FIG. 18. FIG. 18 represents one simple framework customization environment that results from extending the framework customization framework of the present invention. Of course, many different framework customization environments may be implemented with the framework. If a framework customization environment has the same common features with a different environment that is already implemented in the framework, the new environment may use the same subclass without having to duplicate the effort to re-generate the code from scratch. From this we see the power and flexibility of providing a framework for managing framework customization. In sum, the framework not only makes the programmer's job easier, but it also provides a consistent interface for customizing frameworks.

Referring to FIG. 18, the objects for a desired framework customization environment are shown, with names that generally indicate under which classes these objects were instantiated. A user of the framework may be a human operator, a procedural program, or another object. The user is denoted in the object diagram of FIG. 18 as theFrameworkCustomizer object. Let's assume theFrameworkCustomizer invokes the start( ) method on the customizationController object (step 1). In response, the customizationController object invokes the getDomain( ) method on theFrameworkCustomizer to determine the desired domain that contains the input framework (step 2). Once the customizationController has determined the domain, it invokes the getFrameworksForDomain( ) method on theFrameworkLibrary object (step 3), which returns a list of frameworks stored in theFrameworkLibrary for the selected domain. Next the customizationController object invokes the getFramework( ) method on theFrameworkCustomizer object (step 4), which presents to the user a list of frameworks for the selected domain and allows the user to select one of these frameworks as the input framework. Once the input framework has been selected, the customizationController object invokes the instantiateFrameworkFromMetaLanguage( ) method on theFrameworkLibrary object (step 5), which causes the input framework to be instantiated as theCustomizedFramework object. At this point the input framework (i.e., theCustomizedFramework object) has not been customized. Next, the customizationController object invokes getVisibleCore( ) (step 6), getFlow( ) (step 7), and getExtensionPointso (step 8) on theCustomizedFramework that was just instantiated in step 5 to determine the attributes of theCustomizedFramework object. The customizationController object then invokes its own displayFrameworkRepresentation( ) method (step 9), which presents a representation of theCustomizedFramework to theFrameworkCustomizer. In the case of a human user, the representation of theCustomizedFramework will be a graphical representation.

The customizationController object then invokes the getExtensionPointSelections( ) method on theFrameworkCustomizer (step 10), which presents a list of possible extension points in the input framework (i.e., theCustomizedFramework) to theFrameworkCustomizer, which selects one or more desired extension points. One of these extension points is selected, and the extend( ) method on the selected extension point (represented by anExtensionPoint) is called (step 11). This causes the anExtensionPoint object to invoke the execute( ) method on anExtensionPointWizard (step 12), which is an extension point wizard that corresponds to the particular anExtensionPoint( ) object. The anExtensionPointWizard object invokes the getExtensionParameters( ) method on theFrameworkCustomizer object (step 13) to allow the user to specify appropriate extension parameters. Once the extension parameters are determined, the anExtensionPoint object invokes the generateExtension( ) method on an object anExtensionMechanism (step 14) that is an extension mechanism object that corresponds to the selected extension point. The anExtensionMechanism object then invokes the create( ) constructor method on the Extension class (step 15), which creates the object anExtension. Once the extension has been created, it is added to theCustomizedFramework by invoking its storeExtension( ) method (step 16). Steps 11–16 are then suitably repeated for each extension point that the user selected in step 10.

Once all extensions have been created and added to theCustomizedFramework, the customizationController object invokes the storeFramework( ) method on theFrameworkLibrary object (step 17) to store theCustomizedFramework object in the framework library. At this point a customized framework has been created and stored in the framework library, and may be used or further customized at any time in the future. One way to use the customized framework is to generate a custom application from the customized framework. The user (i.e., theFrameworkCustomizer object) starts this process by invoking the generateApplication( ) method on the customizationController object (step 18). In response, the customizationController object invokes the generate( ) method on theCustomizedFramework object (step 19), which in turn causes the generate( ) method on anApplicationGenerator to be invoked (step 20). The creates constructor method is then invoked on the CustomApplication class to create the object aCustomApplication (step 21). This custom application may then be used as required.

The specific implementation of FIG. 18 is shown to explain how framework mechanism 870 may be extended to provide a framework customization mechanism that has specific requirements. By analogy, one skilled in the OO art will recognize that the number of variations possible with framework mechanism 870 is without limit, and that any appropriate extension of the framework mechanism 870 to accomplish the detailed functions of a particular framework customization environment is within the scope of the present invention.

As the example above illustrates, the framework provides an extremely flexible and powerful tool for implementing any number of framework customization environments by simply defining objects that implement the features specific to a particular framework customization environment.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims. Note that the term "user" as used in the claims denotes any human programmer (such as a framework consumer) or any software program that is capable of extending the framework mechanism to define a particular framework customization environment.

What is claimed is:

1. An apparatus comprising:
    a processor;
    a memory coupled to the processor; and
    a first object-oriented framework mechanism residing in the memory and executed by the processor, the first framework mechanism providing at least one framework customization environment for customizing a second framework.

2. The apparatus of claim 1 wherein the first framework mechanism comprises an input framework class, the input framework class defining:

at least one input framework object corresponding to the second framework;

at least one object method that determines at least one extension point in the second framework;

at least one object method that determines flow of control in the second framework; and at least one object method that stores at least one extension to the second framework.

3. The apparatus of claim 2 wherein the input framework class is a core class of the first framework mechanism, the implementation of which cannot be modified by a user.

4. The apparatus of claim 2 wherein the input framework class further defines:

at least one object method that generates a customized application from a customized framework that is generated by customizing the second framework; and at least one object method that displays a core portion of the second framework to a user.

5. The apparatus of claim 2 wherein the first framework mechanism further comprises a framework customization controller class, the framework customization controller class defining:

at least one framework customization controller object; and at least one object method that displays a representation of the second framework; and at least one object method that generates a customized application from a customized framework that is generated by customizing the second framework.

6. The apparatus of claim 5 wherein the first framework mechanism further comprises a framework library class, the framework library class defining:

at least one framework library object;

at least one object method that determines the frameworks stored in the framework library object that correspond to a specified domain;

at least one object method that instantiates at least one framework in the framework library object; and at least one object method that stores at least one framework in the framework library object.

7. The apparatus of claim 6 wherein the first framework mechanism further comprises an extension point class, the extension point class defining:

at least one extension point object; and.

at least one object method that generates at least one extension to the second framework corresponding to the extension point object.

8. The apparatus of claim 7 wherein the first framework mechanism further comprises:

a class that defines a flow of control for the second framework; and a class that defines a core portion of the second framework.

9. The apparatus of claim 7 wherein the first framework mechanism further comprises:

a class that defines at least one extension mechanism for the second framework;

a class that defines at least one extension to the second framework; and a class that defines at least one extension point wizard for the second framework, the extension point wizard using the at least one extension mechanism to generate the at least one extension to the second framework.

10. The apparatus of claim 7 wherein the first framework mechanism further comprises a meta language class, the meta language class defining:

at least one meta language object corresponding to a representation of the second framework that is stored in persistent storage.

11. The apparatus of claim 10 wherein the first framework mechanism further comprises:

a class that defines a mechanism that generates a customized application from a customized framework that is generated by customizing the second framework;

a class that defines generated source code corresponding to the customized application; and a class that defines the customized application.

12. The apparatus of claim 11 wherein the first framework mechanism further comprises a framework customization tools class, the framework customization tools class defining:

at least one framework customization tools object that at least partially determines the framework customization environment.

13. The apparatus of claim 12 wherein the first framework mechanism comprises a framework customizer class, the framework customizer class defining:

at least one framework customizer object corresponding to a user that customizes the second framework.

14. The apparatus of claim 1 wherein the first framework mechanism comprises a framework customization controller class, the framework customization controller class defining:

at least one framework customization controller object;

at least one object method that displays a representation of the second framework; and at least one object method that generates a customized application from a customized framework that is generated by customizing the second framework.

15. The apparatus of claim 14 wherein the framework customization controler class is a core class of the first framework mechanism, the implementation of which cannot be modified by a user.

16. The apparatus of claim 1 wherein the first framework mechanism comprises a framework library class, the framework library class defining:

at least one framework library object;

at least one object method that determines the frameworks stored in the framework library object that correspond to a specified domain;

at least one object method that instantiates at least one framework in the framework library object; and at least one object method that stores at least one framework in the framework library object.

17. The apparatus of claim 16 wherein the framework library class is a core clss of the first framework mechanism, the implementation of which cannot be modified by a user.

18. The apparatus of claim 1 wherein the first framework mechanism comprises an extension point class, the extension point class defining:

at least one extension point object; and at least one object method that generates at least one extension to the second framework corresponding to the extension point object.

19. The apparatus of claim 18 wherein the extension point class is an extensible class of the first framework mechanism, the implementation of which by a user defines at least a portion of the at least one framework customization environment.

20. The apparatus of claim 1 wherein the first framework mechanism comprises:

a class that defines a flow of control for the second framework; and a class that defines a core portion of the second framework.

21. The apparatus of claim 1 wherein the first framework mechanism comprises:
    a class that defines at least one extension mechanism for the second framework;
    a class that defines at least one extension to the second framework; and
    a class that defines at least one extension point wizard for the second framework, the extension point wizard using the at least one extension mechanism to generate the at least one extension to the second framework.

22. The apparatus of claim 1 wherein the first framework mechanism comprises a meta language class, the meta language class defining:
    at least one meta language object corresponding to a representation of the second framework that is stored in persistent storage.

23. The apparatus of claim 1 wherein the first framework mechanism comprises:
    a class that defines a mechanism that generates a customized application from a customized framework that is generated by customizing the second framework;
    a class that defines generated source code corresponding to the customized application; and
    a class that defines the customized application.

24. The apparatus of claim 1 wherein the first framework mechanism comprises a framework customization tools class, the framework customization tools class defining:
    at least one framework customization tools object that at least partially determines the framework customization environment.

25. The apparatus of claim 1 wherein the first framework mechanism comprises framework customizer class, the framework customizer class defining:
    at least one framework customizer object corresponding to a user that customizes the second framework.

26. The apparatus of claim 1 wherein the first framework mechanism comprises:
    at least one core function defined by at least one core class and by the relationships between a plurality of classes within the first framework mechanism, wherein the implementation of the at least one core function is defined by the first framework mechanism and cannot be modified by a user of the first framework mechanism; and
    at least one extensible function defined by at least one extensible class, wherein the implementation of the at least one extensible function is defined by the user of the first framework mechanism by extending the at least one extensible class.

27. A method for customizing a second framework, the method comprising the steps of:
    providing a first extensible object oriented framework mechanism that customizes the second framework according to extended portions of the first framework mechanism; and
    executing the first object oriented framework mechanism on an apparatus.

28. The method of claim 27 further including the step of:
    extending the fist framework mechanism to define a framework customization environment.

29. The method of claim 27 wherein the first object oriented framework mechanism that customizes the second framework performs the steps of:

(a) determining a plurality of extension points in the second framework;
(b) selecting from the plurality of extension points a subset of extension points to extend;
(c) selecting from the subset a selected extension point;
(d) generating at least one extension to the second framework corresponding to the selected extension point;
(e) adding the at least one extension to a customized framework;
(f) repeating steps (c) through (e) for each extension point in the subset to customize the second framework and to create therefrom the customized framework.

30. The method of claim 29 further including the step of interacting with an extension point wizard to complete the extension.

31. The method of claim 29 further including the step of generating a customized application from the customized framework.

32. The method of claim 29 wherein the step of determining a plurality of extension points in the second framework includes the steps of:
    (1) selecting the second framework from a plurality of frameworks that correspond to a selected domain;
    (2) retrieving the second framework;
    (3) instantiating the second;framework; and
    (4) determining the plurality of extension points by interrogating the instantiated second framework.

33. The method of claim 29 wherein the step of selecting from the plurality of extension points a subset of extension points to extend includes the steps of:
    (1) displaying the plurality of extension points to a user; and
    (2) the user selecting the subset of extension points to extend from the displayed plurality of extension points.

34. The method of claim 29 wherein the step of generating at least one extension for the selected extension point includes the steps of:
    (1) determining an extension mechanism that corresponds to the selected extension point; and
    (2) the extension mechanism creating the at least one extension for the selected extension point.

35. A program product comprising:
    a first object-oriented framework mechanism for customizing a second framework, the first framework mechanism including an extensible framework customization mechanism that customizes the second framework according to extended portions of the first framework mechanism that define a framework customization environment; and
    signal bearing media bearing the first framework mechanism.

36. The program product of claim 35 wherein the signal bearing media comprises recordable media.

37. The program product of claim 35 wherein the signal bearing media comprises transmission media.

38. The program product of claim 35 wherein the arst framework mechanism comprises:
    at least one input framework object corresponding to the second framework;
    at least one object method that determines at least one extension point in the second framework;
    at least one object method that determines flow of control in the second framework; and
    at least one object method that stores at least one extension to the second framework.

39. The program product of claim 38 wherein the first framework mechanism further comprises:
 at least one object method that generates a customized application from a customized framework that is generated by customizing the second framework; and
 at least one object method that displays a core portion of the second framework to a user.

40. The program product of claim 35 wherein the first framework mechanism comprises:
 at least one framework customization controller object;
 at least one object method that displays a representation of the second framework; and
 at least one object method that generates a customized application from a customized framework that is generated by customizing the second framework.

41. The program product of claim 35 wherein the first framework mechanism comprises:
 at least one framework library object;
 at least one object method that determines the frameworks stored in the framework library object that correspond to a specified domain;
 at least one object method that instantiates at least one framework in the framework library object; and
 at least one object method that stores at least one framework in the framework library object.

42. The program product of claim 35 wherein the first framework mechanism comprises:
 at least one extension point object; and
 at least one object method that generates at least one extension to the second framework corresponding to the extension point object.

43. The program product of claim 35 wherein the first framework mechanism comprises:
 at least one flow of control object for the second framework; and
 at least one core object for the second framework.

44. The program product of claim 35 wherein the first framework mechanism comprises:
 at least one extension mechanism object for the second framework;
 at least one extension object for the second framework; and
 at least one extension point wizard object for the second framework, the at least one extension point wizard object using the at least one extension mechanism object to generate the at least one extension object for the second framework.

45. The program product of claim 35 wherein the first framework mechanism comprises:
 at least one meta language object corresponding to a representation of the framework that is stored in persistent storage.

46. The program product of claim 35 wherein the first framework mechanism comprises:
 a generator object that generates a customized application from a customized framework that is generated by customizing the second framework;
 a generated source code object corresponding to the customized application; and
 a customized application object corresponding to the customized application.

47. The program product of claim 35 wherein the first framework mechanism comprises:
 at least one framework customization tools object that at least partially determines the framework customization environment.

48. The program product of claim 35 wherein the first framework mechanism comprises:
 at least one framework customizer object corresponding to a user that customizes the second framework.

49. A first object oriented framework mechanism for use in an apparatus that supports an object oriented programming environment, the first framework mechanism comprising:
 at least one input framework object corresponding to a second framework;
 at least one framework customization controller object; and
 at least one extension point object.

50. The first object oriented framework mechanism of claim 49 further comprising:
 at least one framework library object;
 at least one flow of control object for second framework;
 at least one core object for the second framework;
 at least one extension mechanism object for the second framework;
 at least one extension object for the second framework; and
 at least one extension point wizard object for the second framework, the at least one extension point wizard object using the at least one extension mechanism object to generate the at least one extension object for the second framework.

51. The first object oriented framework mechanism of claim 50 further comprising:
 at least one meta language object corresponding to a representation of the second framework that is stored in persistent storage;
 a generator object that generates a customized application from a customized framework that is generated by customizing the second framework;
 a generated source code object corresponding to the customized application; and
 a customized application object corresponding to the customized application.

52. The first object oriented framework mechanism of claim 51 further comprising:
 at least one framework customization tools object that at least partially determines the framework customization environment;
 at least one framework customizer object corresponding to a user that customizes the second framework.

53. The first object oriented framework mechanism of claim 52 further comprising:
 at least one object method that determines at least one extension point in the second framework;
 at least one object method that generates at least one extension to the second framework corresponding to the extension point object;
 at least one object method that stores at least one extension to the second framework;
 at least one object method that determines flow of control in the second framework;
 at least one object method that displays a core portion of the second framework to a user;
 at least one object method that displays a representation of the second framework;

at least one object method that generates a customized application from a customized framework that is generated by customizing the second framework;

at least one object method that determines flow of control in the second framework;

at least one object method that displays a core portion of the second framework to a user;

at least one object method that displays a representation of the second framework; and at least one object method that generates a customized application from a customized framework that is generated by customizing the second framework.

54. The first object oriented framework mechanism of claim 49 further comprising:

at least one meta language object corresponding to a representation of the second framework that is stored in persistent storage;

a generator object that generates a customized application from a customized framework that is generated by customizing the second framework;

a generated source code object corresponding to the customized application; and a customized application object corresponding to the customized application.

55. The first object oriented framework mechanism of claim 49 further comprising:

at least one framework customization tools object that at least partially determines the framework customization environment; and at least one framework customizer object corresponding to a user that customizes the second framework.

56. The first object oriented framework mechanism of claim 49 further comprising:

at least one object method that determines at least one extension point in the second framework;

at least one object method that generates at least one extension to the second framework corresponding to the extension point object; and at least one object method that stores at least one extension to the second framework.

57. The first object oriented framework mechanism of claim 49 further comprising:

at least one object method that generates a customized application from a customized framework that is generated by customizing the second framework.

58. The first object oriented framework mechanism of claim 49 further comprising:

at least one object method that determines flow of control in the second framework;

at least one object method that displays a core portion of the second framework to a user; and at least one object method that displays a representation of the second framework.

59. The first object oriented framework mechanism of claim 56 further comprising:

at least one object method that generates a customized application from a customized framework that is generated by customizing the second framework.

60. The first object oriented framework mechanism of claim 49 further comprising:

at least one core function defined by relationships between a plurality of classes within the first framework mechanism, wherein the implementation of the at least one core function is defined by the in framework mechanism and cannot be modified by a user of the first framework mechanism; and at least one extensible function defined by at least one extensible class, wherein the implementation of the at least one extensible function is defined by the user of the first framework mechanism by extending the at least one extensible class.

61. A method for customizing a second framework, the method comprising the steps of:

(A) providing a first object oriented framework mechanism comprising:

at least one input framework object corresponding to the second framework;

at least one framework customization controller object;

at least one framework library object; and at least one extension point object;

(B) executing the first object oriented framework mechanism on an apparatus to customize the second framework.

62. The method of claim 61 wherein the first object oriented framework mechanism further comprises:

at least one flow of control object for the second framework;

at least one core object for the second framework;

at least one extension mechanism object for the second framework;

at least one extension object for the second framework; and at least one extension point wizard object for the second framework, the at least one extension point wizard object using the at least one extension mechanism object to generate the at least one extension object for the second framework.

63. The method of claim 61 wherein the first object oriented framework mechanism further comprises:

at least one meta language object corresponding to a representation of the second framework that is stored in persistent storage;

a generator object that generates a customized application from a customized framework that is generated by customizing the second framework;

a generated source code object corresponding to the customized application; and a customized application object corresponding to the customized application.

64. The method of claim 61 further including the step of:

extending the first framework mechanism to define a desired framework customization environment.

65. The method of claim 64 further including the steps of:

selecting functions required by the desired framework customization environment; and extending the first framework mechanism to implement a plurality of classes and object methods that perform all the selected functions.

66. A program product comprising:

(A) a first object oriented framework mechanism for customizing a second framework including at least one input framework object corresponding to the second framework, at least one framework customization controller object, and at least one extension point object, wherein the first object oriented framework mechanism customizes the second framework according to extended portions of the first framework mechanism that are customized to provide the desired framework customization environment; and (B) signal bearing media bearing the first object oriented framework mechanism.

67. The program product of claim 66 wherein the signal bearing media comprises recordable media.

68. The program product of claim 66 wherein the signal bearing media comprises transmission media.

69. The program product of claim 66 wherein the first object oriented framework mechanism further comprises:
- at least one framework library object, and at least one extension point object;
- at least one flow of control object for the second framework;
- at least one core object for the second framework;
- at least one extension mechanism object for the second framework;
- at least one extension object for the second framework; and
- at least one extension point wizard object for the second framework, the at least one extension point wizard object using the at least one extension mechanism object to generate the at least one extension object for the second framework.

70. The program product of claim 66 further comprising:
- at least one meta language object corresponding to a representation of the second framework that is stored in persistent storage;
- a generator object that generates a customized application from a customized framework that is generated by customizing the second framework;
- a generated source code object corresponding to the customized application; and
- a customized application object corresponding to the customized application.

71. The program product of claim 66 further comprising:
- at least one framework customization tools object that at least partially determines the framework customization environment; and
- at least one framework customizer object corresponding to a user that customizes the second framework.

72. The program product of claim 66 wherein the at least one extension point object is defined by at least one extensible class of the first framework mechanism, the implementation of which by a user defines at least a portion of the at least one framework customization environment.

73. The program product of claim 66 wherein the at least one input framework object and the at least one framework customization controller object are defined by core classes of the first framework mechanism, the implementation of which cannot be changed by a user.

74. The program product of claim 66 further comprising:
- at least one object method that determines at least one extension point in the second framework;
- at least one object method that generates at least one extension to the second framework corresponding to the extension point object; and
- at least one object method that stores at least one extension to the second framework.

75. The program product of claim 74 further comprising:
- at least one object method that determines flow of control in the second framework;
- at least one object method that displays a core portion of the second framework to a user; and
- at least one object method that displays a representation of the second framework.

76. A first object oriented framework mechanism that customizes a second framework, the first framework mechanism comprising:
- at least one core function defined by relationships between a plurality of classes within the first framework mechanism, wherein the implementation of the at least one core function is defined by the first framework mechanism and cannot be modified by a user of the first framework mechanism; and
- at least one extensible class wherein the implementation of the at least one extensible class is defined by the user of the first framework mechanism, by extending the at least one extensible class, thereby defining at least one framework customization environment.

77. The first object oriented framework mechanism of claim 76 further comprising:
- at least one input framework object corresponding to the second framework;
- at least one framework customization controller object; and
- at least one extension point object.

78. The first object oriented framework mechanism of claim 77 further comprising:
- at least one framework library object, and at least one extension point object;
- at least one flow of control object for the second framework;
- at least one core object for the second framework;
- at least one extension mechanism object for the second framework;
- at least one extension object for the second framework; and
- at least one extension point wizard object for the second framework, the at least one extension point wizard object using the at least one extension mechanism object to generate the at least one extension object for the second framework.

79. The first object oriented framework mechanism of claim 77 further comprising:
- at least one framework customization tools object that at least partially determines the framework customization environment; and
- at least one framework customizer object corresponding to a user that customizes the second framework.

80. The program product of claim 76 further comprising:
- at least one object method that determines at least one extension point in the second framework;
- at least one object method that generates at least one extension to the second framework corresponding to the extension point object; and
- at least one object method that stores at least one extension to the second framework.

81. The program product of claim 80 further comprising:
- at least one object method that determines flow of control in the second framework;
- at least one object method that displays a core portion of the second framework to a user; and
- at least one object method that displays a representation of the second framework.

82. A method for customizing a second framework using an apparatus having a processor and a memory, the memory having a program that provides an object oriented programming environment, the method comprising the steps of:
(A) providing in the program a first object oriented framework mechanism that performs the framework customization according to extended portions of the first framework mechanism that are customized to provide a desired framework customization environment, the first framework mechanism including:

a set of core functions wherein the implementation of the core functions is defined by the first framework mechanism and cannot be modified by a user of the first framework mechanism; and a set of extensible functions wherein the implementation of the extensible functions is defined by the user of the first framework mechanism;

(B) extending the extensible functions in the first framework mechanism to define particular classes having predetermined protocols and defining particular object methods that perform the framework customization, the extensible functions defining the desired framework customization environment;

(C) generating an executable framework customization system by integrating together the extensible functions and the core functions; and (D) executing the executable framework customization system on the apparatus.

83. The method of claim 82 further including the steps of:

(E) determining a plurality of extension points in the second framework;

(F) selecting from the plurality of extension points a subset of extension points to extend;

(G) selecting from the subset a selected extension point;

(H) generating at least one extension for the selected extension point;

(I) adding the at least one extension to a customized framework;

(J) repeating steps (G) through (I) for each extension point in the subset to customize the second framework and to create therefrom the customized framework.

84. The method of claim 83 further including the step of interacting with an extension point wizard to complete the extension.

85. The method of claim 83 further including the step of generating a customized application from the customized framework.

86. The method of claim 83 wherein the step of determining a plurality of extension points in the second framework includes the steps of:

(1) selecting the send framework from a plurality of frameworks that correspond to a selected domain;

(2) retrieving the second framework;

(3) instantiating the second framework;

(4) determining the plurality of extension points by interrogating the instantiated second framework.

87. The method of claim 83 wherein the step of selecting from the plurality of extension points a subset of extension points to extend includes the steps of:

(1) displaying the plurality of extension points to a user; and (2) the user selecting the subset of extension points to extend from the displayed plurality of extension points.

88. The method of claim 83 wherein the step of generating at least one extension for the selected extension point includes the steps of:

(1) determining an extension mechanism that corresponds to the selected extension point; and (2) the extension mechanism creating the at least one extension for the selected extension point.

89. A program product comprising:

a first object oriented framework mechanism for customizing a second framework, the first framework mechanism including at least one core function defined by relationships between a plurality of classes within the first framework mechanism, wherein the implementation of the at least one core function is defined by the first framework mechanism and cannot be modified by a user of the first framework mechanism, the first framework mechanism further including at least one extensible function defined by at least one extensible class, wherein the implementation of the at least one extensible class is defined by the user of the first framework mechanism by extending the at least one extensible class, thereby defining a framework customization environment that governs the operation of the first framework mechanism; and signal bearing media bearing the first object oriented framework mechanism.

90. The program product of claim 89 wherein the signal bearing media comprises recordable media.

91. The program product of claim 89 wherein the signal bearing media comprises transmission media.

92. The program product of claim 89 wherein the first framework mechanism comprises:

at least one input framework object corresponding to the second framework;

at least one framework customization controller object;

at least one extension point object;

wherein the first object oriented framework mechanism performns the framework customization according to extended portions of the first framework mechanism that are customized to provide a desired framework customization environment.

93. The program product of claim 92 further comprising:

at least one framework library object, and at least one extension point object;

at least one flow of control object for the second framework;

at least one core object for the second framework;

at least one extension mechanism object for the second framework;

at least one extension object for the second framework; and at least one extension point wizard object for the second framework, the at least one extension point wizard object using the at least one extension mechanism object to generate the at least one extension object for the second framework.

* * * * *